(12) United States Patent
Yamano

(10) Patent No.: US 9,432,585 B2
(45) Date of Patent: Aug. 30, 2016

(54) ZOOM LENS AND IMAGING APPARATUS

(71) Applicant: Sony Corporation, Tokyo (JP)

(72) Inventor: Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 173 days.

(21) Appl. No.: 14/489,734

(22) Filed: Sep. 18, 2014

(65) Prior Publication Data
US 2015/0124126 A1 May 7, 2015

(30) Foreign Application Priority Data

Nov. 6, 2013 (JP) ................................ 2013-230222

(51) Int. Cl.
*G02B 15/173* (2006.01)
*H04N 5/232* (2006.01)

(52) U.S. Cl.
CPC ........ *H04N 5/23296* (2013.01); *G02B 15/173* (2013.01)

(58) Field of Classification Search
CPC .... G02B 13/009; G02B 15/00; G02B 15/14; G02B 15/16; G02B 15/173
USPC ................................ 359/687, 774; 348/240.3
See application file for complete search history.

(56) References Cited

U.S. PATENT DOCUMENTS

| | | | |
|---|---|---|---|
| 2011/0051256 A1* | 3/2011 | Inoue | G02B 15/177 359/683 |
| 2013/0321655 A1* | 12/2013 | Abe | G02B 15/173 348/208.11 |

FOREIGN PATENT DOCUMENTS

| | | |
|---|---|---|
| JP | 2005-062228 | 3/2005 |
| JP | 2007-171248 | 7/2007 |

* cited by examiner

*Primary Examiner* — Ricky Mack
*Assistant Examiner* — Gary O'Neill
(74) *Attorney, Agent, or Firm* — Michael Best & Friedrich LLP

(57) ABSTRACT

A zoom lens includes, in order from an object side to an image side: a first lens group that has a positive refractive power; a second lens group that has a negative refractive power; a third lens group that has a positive refractive power; and a fourth lens group that has a positive refractive power. During zooming from a wide-angle end to a telephoto end, the first lens group is stationary relative to an imaging surface, and the second lens group is moved to the image side in an optical axis direction so as to decrease a space between the second lens group and the third lens group. The third lens group includes a positive lens, a negative lens, and a cemented lens. The zoom lens satisfies $-0.95 < fg3\_neg/fg3 < -0.5$. Here, $fg3\_neg$ is a focal length of the negative lens of the third lens group, and $fg3$ is a focal length of the third lens group.

21 Claims, 16 Drawing Sheets

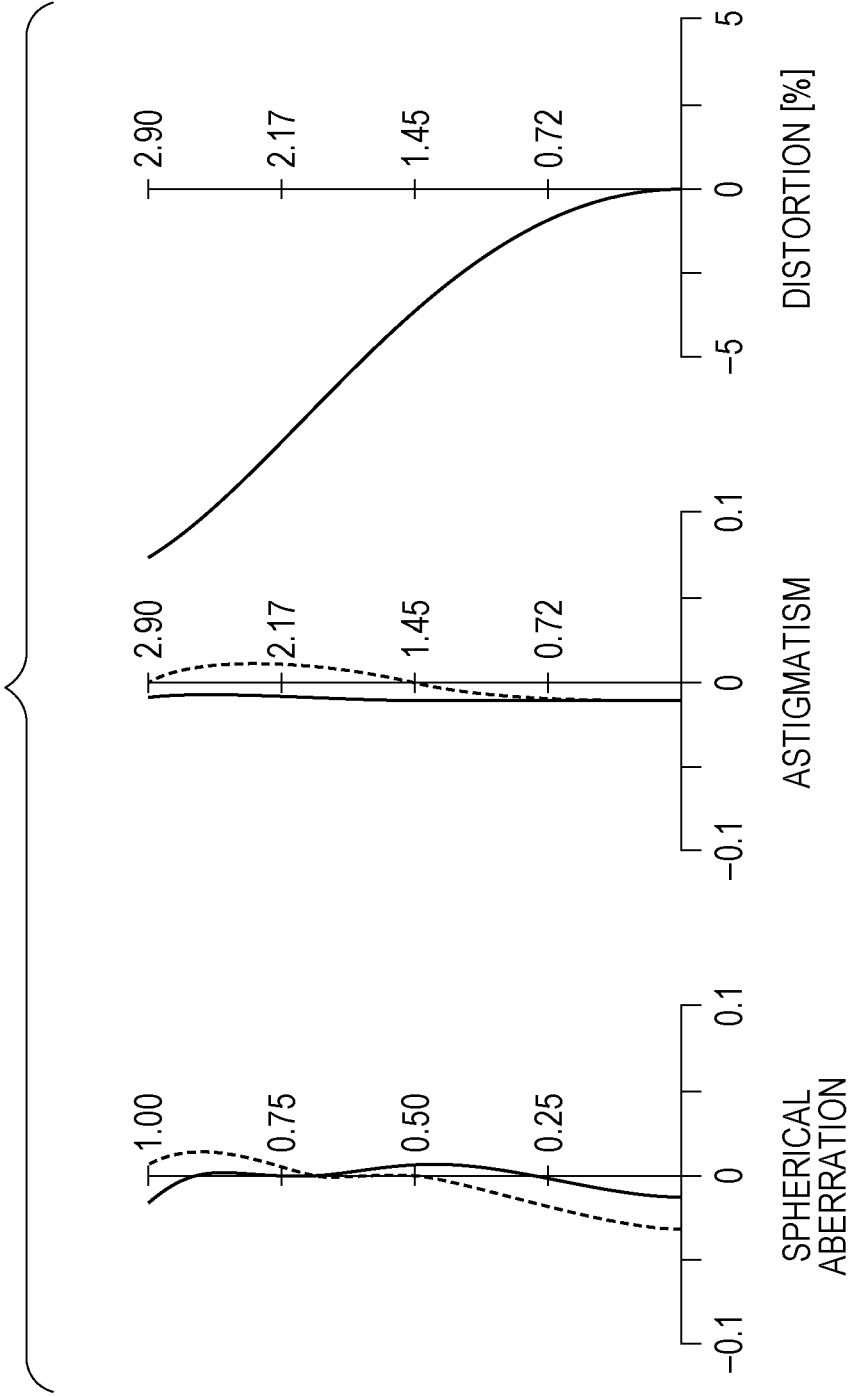

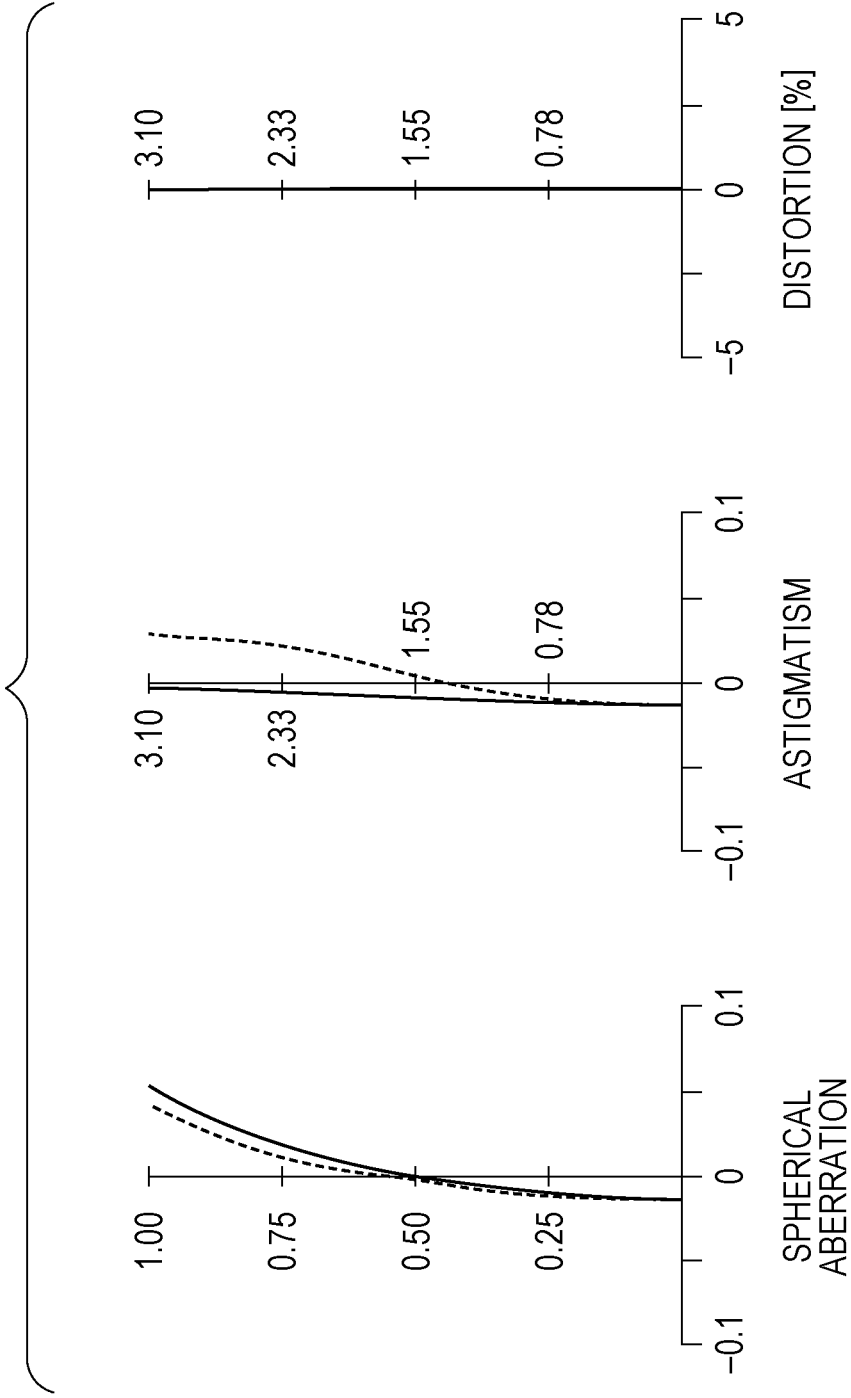

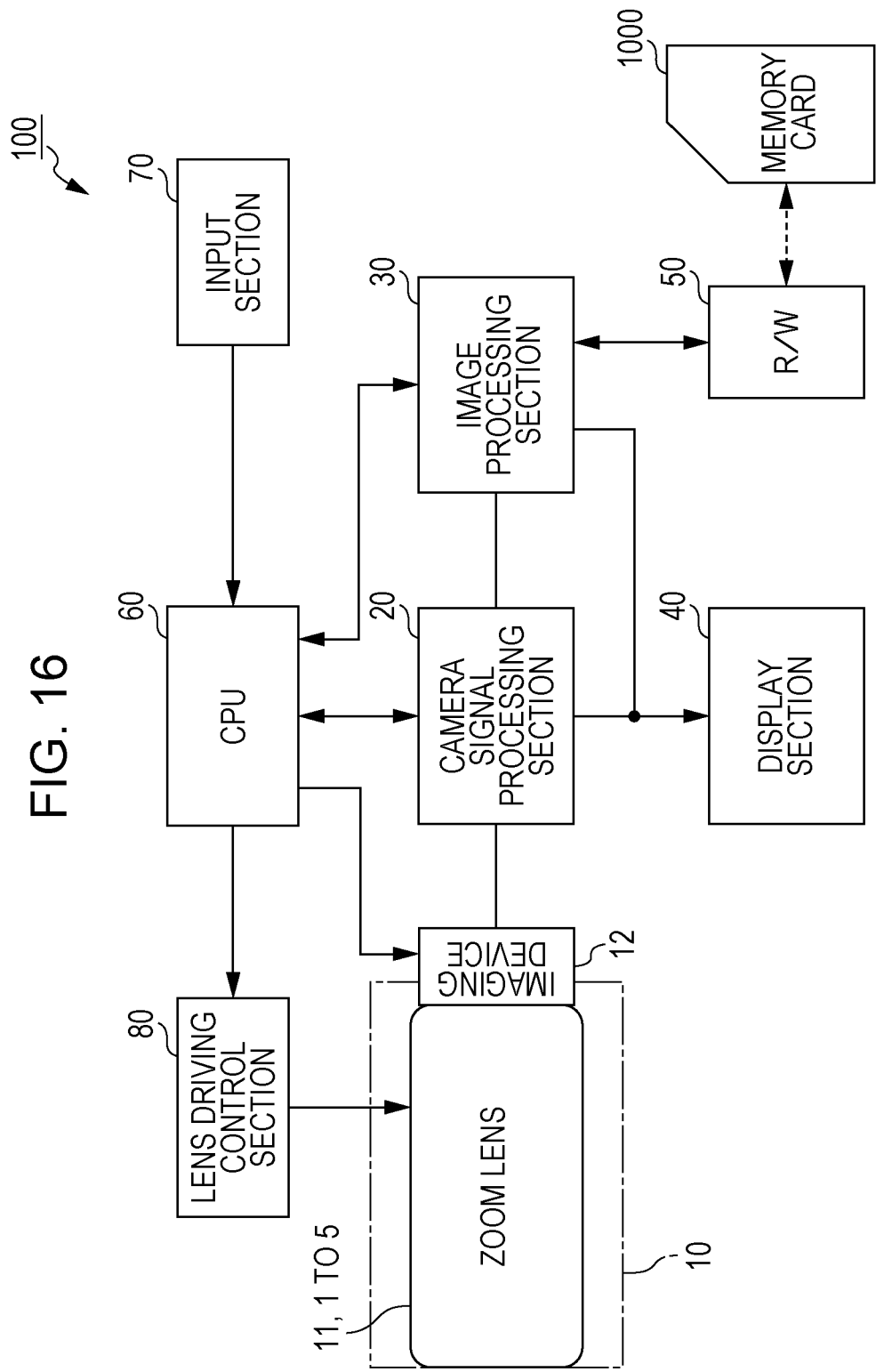

ZOOM LENS AND IMAGING APPARATUS

CROSS REFERENCE TO RELATED APPLICATIONS

This application claims the benefit of Japanese Priority Patent Application JP 2013-230222 filed Nov. 6, 2013, the entire contents of which are incorporated herein by reference.

BACKGROUND

The present technology relates to a technical field of a zoom lens, which has a high zoom ratio and a sufficient speed throughout the entire zoom range and is capable of achieving a sufficient increase in an imaging angle of view, and an imaging apparatus using the zoom lens.

Recently, as the market of imaging apparatuses such as the digital still camera has increased, users have varied demands for digital still cameras. In addition to an increase in image quality and a decrease in size, demand for an increase in the magnification of a photography lens and an increase in the imaging angle of view has also increased.

As a zoom lens used in such imaging apparatuses, there is a positive lead type zoom lens of which a lens group closest to the object side has a positive refractive power. The positive lead type zoom lens is advantageous in an increase in a zoom ratio and is advantageous in that the optical system can be designed so as to be fast across the entire zoom range. Hence, for example, the positive lead type zoom lens has been widely used as a lens appropriate for a high-power type zoom lens in which the zoom ratio is greater than five times.

In particular, as a positive lead type typical zoom lens, there is a well-known zoom lens which is formed of four lens groups having positive, negative, positive, and positive refractive powers arranged in order from the object side to the image side (for example, refer to Japanese Unexamined Patent Application Publication No. 2005-62228 and Japanese Unexamined Patent Application Publication No. 2007-171248).

SUMMARY

However, the zoom lenses, which are formed of four lens groups having positive, negative, positive, and positive refractive powers, described in Japanese Unexamined Patent Application Publication No. 2005-62228 and Japanese Unexamined Patent Application Publication No. 2007-171248 achieve an increase in magnification ratio up to around 10 times, but do not yet achieve a sufficient increase in the imaging angle of view at the wide-angle end.

Further, for example, it is necessary for a zoom lens of a camera, such as a 3-CMOS camera, in which a color separation prism is disposed between an imaging device and an optical system, a zoom lens mounted on an interchangeable-lens camera, and the like to sufficiently secure a back focal length of the optical system. However, in design, it is difficult for such an optical system to achieve, particularly, both a sufficient back focal length and a sufficient increase in the imaging angle of view on the wide-angle side where the focal length is short. In the zoom lens described in Japanese Unexamined Patent Application Publication No. 2007-171248, this problem has been attempted to be solved, but a sufficient increase in the imaging angle of view has not been achieved.

Furthermore, in the imaging apparatus using the imaging device, in order to make an illuminance of the image plane uniform, it is preferable to employ a zoom lens which is substantially telecentric on the image side. As such a zoom lens, it is preferable to use a zoom lens in which a lens group closest to the image side has a positive refractive power.

According to the zoom lens and the imaging apparatus of the present technology, it is desirable to secure a high zoom ratio and a sufficient speed throughout the entire zoom range and to achieve a sufficient increase in the imaging angle of view.

According to a first embodiment of the present technology, there is provided a zoom lens including, in order from an object side to an image side: a first lens group that has a positive refractive power; a second lens group that has a negative refractive power; a third lens group that has a positive refractive power; and a fourth lens group that has a positive refractive power, in which during zooming from a wide-angle end to a telephoto end, the first lens group is stationary relative to an imaging surface, and the second lens group is moved to the image side in an optical axis direction so as to decrease a space between the second lens group and the third lens group, in which the third lens group includes, in order from the object side to the image side, a positive lens, a negative lens, and a cemented lens which has a positive refractive power and is formed of a positive lens positioned on the object side and a negative lens positioned on the image side, and in which the following Conditional Expression (1) is satisfied.

$$-0.95 < fg3\_neg/fg3 < -0.5, \quad (1)$$

where $fg3\_neg$ is a focal length of the negative lens which is a second element from the object side in the third lens group, and $fg3$ is a focal length of the third lens group.

Thereby, it is possible to appropriately correct spherical aberration, comatic aberration, and chromatic aberration of the third lens group.

According to a second embodiment of the present technology, there is provided another zoom lens including, in order from an object side to an image side: a first lens group that has a positive refractive power; a second lens group that has a negative refractive power; a third lens group that has a positive refractive power; and a fourth lens group that has a positive refractive power, in which during zooming from a wide-angle end to a telephoto end, the first lens group is stationary relative to an imaging surface, and the second lens group is moved to the image side in an optical axis direction so as to decrease a space between the second lens group and the third lens group, in which the third lens group includes, in order from the object side to the image side, a positive lens, a negative lens, and a cemented lens which has a positive refractive power and is formed of a positive lens positioned on the object side and a negative lens positioned on the image side, and in which the following Conditional Expressions (2) and (3) are satisfied.

$$1.85 < Ndg3\_neg < 1.95, \text{ and} \quad (2)$$

$$20.0 < vdg3\_neg < 30.0, \quad (3)$$

where $Ndg3\_neg$ is a refractive index of glass of the negative lens, which is the second element from the object side in the third lens group, at the d-line, and $vdg3\_neg$ is an Abbe number of the glass of the negative lens, which is the second element from the object side in the third lens group, at the d-line.

Thereby, it is possible to appropriately correct spherical aberration, comatic aberration, and chromatic aberration of the third lens group.

According to a third embodiment of the present technology, in the zoom lens, it is preferable that, during zooming from the wide-angle end to the telephoto end, the third lens group be moved in the optical axis direction so as to decrease the space between the second lens group and the third lens group.

Thereby, compared with an optical system in which the third lens group is stationary relative to the imaging device during zooming, it is possible to effectively apply a power variation effect of the third lens group to a zoom ratio of the whole system.

According to a fourth embodiment of the present technology, in the zoom lens, it is preferable that, during zooming from the wide-angle end to the telephoto end, the third lens group be moved only unidirectionally toward the object side in the optical axis direction.

Thereby, hysteresis or backlash caused by the components of a lens barrel and an actuator for moving the third lens group is suppressed during zooming.

According to a fifth embodiment of the present technology, it is preferable that the zoom lens satisfy the following Conditional Expression (4).

$$7.0 < fg3/fw < 11.0, \quad (4)$$

where fw is a focal length of a whole optical system at the wide-angle end when focus is at infinity.

Thereby, a degree of contribution of power variation of the third lens group to zooming increases, and an amount of occurrence of various aberrations of the third lens group is reduced.

According to a sixth embodiment of the present technology, it is preferable that the zoom lens satisfy the following Conditional Expression (5).

$$0.10 < \{\beta g3(t)/\beta g3(w)\}/\{ft/fw\} < 0.22, \quad (5)$$

where

βg3(w) is a lateral magnification of the third lens group at the wide-angle end when focus is at infinity, βg3(t) is a lateral magnification of the third lens group at the telephoto end when focus is at infinity, fw is a focal length of a whole optical system at the wide-angle end when focus is at infinity, and ft is a focal length of the whole optical system at the telephoto end when focus is at infinity.

Thereby, the degree of contribution of power variation of the third lens group is appropriately set, and the amount of occurrence of various aberrations of the third lens group is suppressed.

According to a seventh embodiment of the present technology, it is preferable that the zoom lens satisfy the following Conditional Expression (6).

$$0.65 < fsl3/fg3 < 1.05, \quad (6)$$

where fsl3 is a focal length of the cemented lens of the third lens group.

Thereby, a refractive power of the cemented lens of the third lens group is appropriately set, the degree of contribution of the third lens group to zooming increases, and the amount of occurrence of various aberrations of the third lens group is suppressed.

According to an eighth embodiment of the present technology, it is preferable that the zoom lens satisfy the following Conditional Expression (7).

$$-0.90 < Rsl3/fg3 < -0.50, \quad (7)$$

where

Rsl3 is a radius of curvature of a cemented surface of the cemented lens of the third lens group.

Thereby, a curvature of the cemented surface of the cemented lens of the third lens group is appropriately set, the effect of correction of lateral chromatic aberration of the cemented lens increases, and chromatic comatic aberration, which is caused by the cemented surface, is suppressed.

According to a ninth embodiment of the present technology, in the zoom lens, it is preferable that the second lens group include, in order from the object side to the image side, a negative lens, a negative lens, and a cemented lens which has a positive refractive power and is formed of a positive lens positioned on the object side and a negative lens positioned on the image side.

Thereby, a position of the front principal point of the second lens group having the negative refractive power can be disposed to be as close as possible to the object side, and chromatic comatic aberration on the wide-angle side and longitudinal chromatic aberration on the telephoto side are appropriately corrected.

According to a tenth embodiment of the present technology, it is preferable that the zoom lens satisfy the following Conditional Expression (8).

$$-3.5 < fg2/fw < -2.0, \quad (8)$$

where fg2 is a focal length of the second lens group, and fw is a focal length of a whole optical system at the wide-angle end when focus is at infinity.

Thereby, a refractive power of the second lens group is appropriately set, a moving stroke necessary for zooming is reduced, and occurrence of the curvature of field of the second lens group is suppressed.

According to an eleventh embodiment of the present technology, it is preferable that the zoom lens satisfy the following Conditional Expression (9).

$$-4.5 < fsl2/fg2 < -2.7, \quad (9)$$

where fsl2 is a focal length of a cemented lens of the second lens group, and fg2 is a focal length of the second lens group.

Thereby, a cemented lens of the refractive power of the second lens group is appropriately set, aberrations of the cemented lens are appropriately corrected, and amount of occurrence of lateral chromatic aberration and comatic aberration at the wide-angle end corrected by the cemented lens is suppressed.

According to a twelfth embodiment of the present technology, it is preferable that the zoom lens satisfy the following Conditional Expression (10).

$$1.5 < Rsl2/fg2 < 2.7, \quad (10)$$

where

Rsl2 is a radius of curvature of a cemented surface of a cemented lens of the second lens group, and fg2 is a focal length of the second lens group.

Thereby, the curvature of the cemented surface of the cemented lens is appropriately set, the effect of correction of lateral chromatic aberration of the cemented lens on the wide-angle side increases, and chromatic comatic aberration, which is caused by the cemented surface, on the wide-angle side is suppressed.

According to a thirteenth embodiment of the present technology, in the zoom lens, it is preferable that the first lens group include, in order from the object side to the image side, a cemented lens which has a negative refractive power and is formed of a negative lens positioned on the object side and a positive lens positioned on the image side, a positive lens, and a positive lens.

Thereby, astigmatism, which is caused by a peripheral image height, is appropriately corrected even in an optical system of which the angle of view is increased, and spherical aberration and longitudinal chromatic aberration on the telephoto side are appropriately corrected even in an optical system of which the magnification is increased.

According to a fourteenth embodiment of the present technology, it is preferable that the zoom lens satisfy the following Conditional Expression (11).

$$15 < fg1/fw < 23, \quad (11)$$

where fg1 is a focal length of the first lens group, and fw is a focal length of a whole optical system at the wide-angle end when focus is at infinity.

Thereby, the refractive power of the first lens group is appropriately set, a diameter of an entrance pupil on the telephoto side can be increased, and occurrence of astigmatism on the wide-angle side and spherical aberration on the telephoto side is suppressed.

According to a fifteenth embodiment of the present technology, it is preferable that the zoom lens satisfy the following Conditional Expression (12).

$$-10.5 < fsl1/fg1 < -5.0, \quad (12)$$

where fsl1 is a focal length of a cemented lens of the first lens group, and fg1 is a focal length of the first lens group.

Thereby, a refractive power of the cemented lens of the first lens group is appropriately set, the effect of correction of the astigmatism is enhanced, and occurrence of astigmatism, spherical aberration or longitudinal chromatic aberration caused by the cemented lens is suppressed.

According to a sixteenth embodiment of the present technology, in the zoom lens, it is preferable that, during zooming from the wide-angle end to the telephoto end, the fourth lens group be moved in the optical axis direction, and it is preferable that, during focusing, the zoom lens be in focus by moving the fourth lens group in the optical axis direction.

Thereby, the magnification of the lens can be increased with the total length shortened, and various aberrations are suppressed in the entire focus range from infinity focusing to close-up focusing.

According to a seventeenth embodiment of the present technology, in the zoom lens, it is preferable that the third lens group have a function of correcting image blur by shifting the cemented lens in a direction orthogonal to the optical axis direction.

Thereby, a favorable blur correction function is secured, and a load to an actuator at the time of lens driving for the image blur correction is reduced.

According to an eighteenth embodiment of the present technology, in the zoom lens, it is preferable that an aperture stop, which determines an F number, be disposed between the second lens group and the third lens group, and it is preferable that, during zooming, the aperture stop be stationary relative to the imaging surface.

Thereby, it is not necessary to move an iris unit for driving an iris stop during zooming.

According to a nineteenth embodiment of the present technology, there is provided an imaging apparatus including: a zoom lens; and an imaging device that converts an optical image, which is formed by the zoom lens, into an electrical signal, in which the zoom lens includes, in order from an object side to an image side, a first lens group that has a positive refractive power, a second lens group that has a negative refractive power, a third lens group that has a positive refractive power, and a fourth lens group that has a positive refractive power, in which during zooming from a wide-angle end to a telephoto end, the first lens group is stationary relative to an imaging surface, and the second lens group is moved to the image side in an optical axis direction so as to decrease a space between the second lens group and the third lens group, in which the third lens group includes, in order from the object side to the image side, a positive lens, a negative lens, and a cemented lens which has a positive refractive power and is formed of a positive lens positioned on the object side and a negative lens positioned on the image side, and in which the following Conditional Expression (1) is satisfied.

$$-0.95 < fg3\_neg/fg3 < -0.5, \quad (1)$$

where fg3_neg is a focal length of the negative lens which is a second element from the object side in the third lens group, and fg3 is a focal length of the third lens group.

Thereby, it is possible to appropriately correct spherical aberration, comatic aberration, and chromatic aberration of the third lens group.

According to a twentieth embodiment of the present technology, there is provided another imaging apparatus including: a zoom lens; and an imaging device that converts an optical image, which is formed by the zoom lens, into an electrical signal, in which the zoom lens includes, in order from an object side to an image side, a first lens group that has a positive refractive power, a second lens group that has a negative refractive power, a third lens group that has a positive refractive power, and a fourth lens group that has a positive refractive power, in which during zooming from a wide-angle end to a telephoto end, the first lens group is stationary relative to an imaging surface, and the second lens group is moved to the image side in an optical axis direction so as to decrease a space between the second lens group and the third lens group, in which the third lens group includes, in order from the object side to the image side, a positive lens, a negative lens, and a cemented lens which has a positive refractive power and is formed of a positive lens positioned on the object side and a negative lens positioned on the image side, and in which the following Conditional Expressions (2) and (3) are satisfied.

$$1.85 < Ndg3\_neg < 1.95, \text{ and} \quad (2)$$

$$20.0 < vdg3\_neg < 30.0, \quad (3)$$

where

Ndg3_neg is a refractive index of glass of the negative lens, which is the second element from the object side in the third lens group, at the d-line, and vdg3_neg is an Abbe number of the glass of the negative lens, which is the second element from the object side in the third lens group, at the d-line.

Thereby, it is possible to appropriately correct spherical aberration, comatic aberration, and chromatic aberration of the third lens group.

According to a twenty-first embodiment of the present technology, in the imaging apparatus, it is preferable that a prism block, which separates colors of the optical image, be disposed between the zoom lens and the imaging device.

Thereby, colors of the optical image, which is incident onto the prism block, are separated, thereby generating a photographed image.

According to the present technology, even when the zoom ratio of the optical system is increased, reduction in the total length is achieved, various aberrations of the third lens group are suppressed, and a sufficient back focal length of the optical system is secured. As a result, it is possible to secure a high zoom ratio and a sufficient speed throughout the entire zoom range, and it is possible to achieve a sufficient increase in the imaging angle of view.

It should be noted that the effect described herein is not necessarily limited, and may be either one of the effects described in the present disclosure.

BRIEF DESCRIPTION OF THE DRAWINGS

FIG. 14 is a diagram illustrating spherical aberration, astigmatism, and distortion at the wide-angle end in a numerical example in which specific numerical values are applied to the fifth embodiment;

FIG. 15 is a diagram illustrating spherical aberration, astigmatism, and distortion at the telephoto end in the numerical example in which specific numerical values are applied to the fifth embodiment; and FIG. 16 is a block diagram illustrating an example of an imaging apparatus.

DETAILED DESCRIPTION OF EMBODIMENTS

Figure 1:
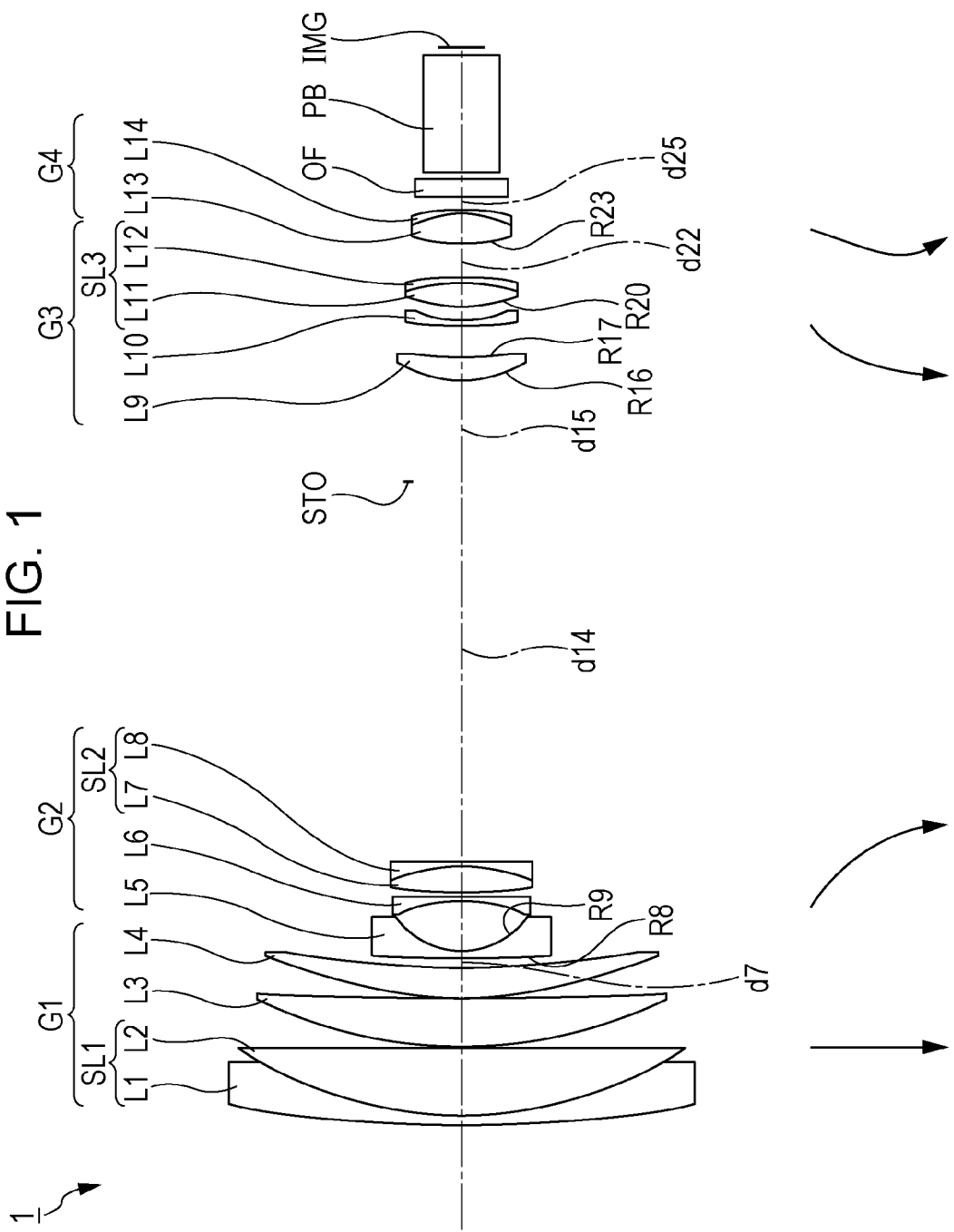
FIG. 1 is a diagram illustrating a lens configuration of a zoom lens according to a first embodiment included in embodiments of zoom lenses and imaging apparatuses according to the present technology shown in FIGS. 2 to 16.

Hereinafter, preferred embodiments for embodying a zoom lens and an imaging apparatus according to the present technology will be described.

Configuration of Zoom Lens

A zoom lens according to the present technology includes, in order from the object side to the image side: a first lens group that has a positive refractive power; a second lens group that has a negative refractive power; a third lens group that has a positive refractive power; and a fourth lens group that has a positive refractive power. Further, in the zoom lens according to the present technology, during zooming from a wide-angle end to a telephoto end, the first lens group is stationary relative to an imaging surface, and the second lens group is moved to the image side in an optical axis direction so as to decrease a space between the second lens group and the third lens group. Furthermore, in the zoom lens according to the present technology, the third lens group includes, in order from the object side to the image side, a positive lens, a negative lens, and a cemented lens which has a positive refractive power and is formed of a positive lens positioned on the object side and a negative lens positioned on the image side.

By forming the zoom lens in such a manner, even when the zoom ratio of the optical system is set to be high, it is possible to reduce the total length of the optical system. Besides, it is possible to appropriately correct spherical aberration, comatic aberration, and chromatic aberration of the third lens group. Hence, it becomes easy to achieve an increase in the image quality.

The zoom lens according to the present technology satisfies the following Conditional Expression (1).

$$-0.95 < fg3\_neg/fg3 < -0.5, \quad (1)$$

where fg3_neg is a focal length of the negative lens which is a second element from the object side in the third lens group, and fg3 is a focal length of the third lens group.

Conditional Expression (1) relates to a focal length of the negative lens which is the second element from the object side in the third lens group.

When the result of Conditional Expression (1) is less than the lower limit thereof, the refractive power of the negative lens excessively decreases, and thus the magnification ratio of the negative lens decreases. Accordingly, particularly, when the optical design is made such that the focal length decreases in order to achieve an increase in the angle of view of the optical system, it is difficult to sufficiently secure a back focal length of the optical system. As a result, it is difficult for the optical design to be applied to an imaging apparatus for which a long back focal length is necessary like a camera using a color separation prism or an interchangeable lens camera.

In contrast, when the result of Conditional Expression (1) is greater than the upper limit thereof, the refractive power of the negative lens excessively increases, and thus occurrence of spherical aberration, comatic aberration, and astigmatism of the third lens group excessively increases. As a result, the image quality is deteriorated.

Accordingly, by making the zoom lens satisfy Conditional Expression (1), the refractive power of the negative lens is appropriately set, the back focal length of the optical system can be sufficiently secured, and occurrence of spherical aberration, comatic aberration, and astigmatism of the third lens group decreases. As a result, it is possible to improve the image quality.

In addition, in order to obtain better optical performance, it is preferable that the zoom lens satisfy the following Conditional Expression (1)'.

$$-0.95 < fg3\_neg/fg3 < -0.6 \tag{1}'$$

By making the zoom lens satisfy Conditional Expression (1)', the effect of Conditional Expression (1) is further enhanced, the back focal length of the optical system can be sufficiently secured, and occurrence of spherical aberration, comatic aberration and astigmatism of the third lens group further decreases. As a result, it is possible to further improve the image quality.

In the zoom lens according to an embodiment of the present technology, it is preferable that, during zooming from the wide-angle end to the telephoto end, the third lens group be moved in the optical axis direction so as to decrease the space between the second lens group and the third lens group.

By forming the zoom lens in such a manner, compared with the optical system in which the third lens group is stationary relative to the imaging device during zooming, it is possible to effectively apply a power variation effect of the third lens group to a zoom ratio of the whole system. In particular, even when the optical design is made such that the focal length decreases in order to achieve an increase in the angle of view of the optical system, arrangement of the third lens group in the optical axis direction can be optimized. With such an optical design, it is possible to correct comatic aberration of the third lens group at the wide-angle end and secure the back focal length thereof in a balanced manner.

In the zoom lens according to an embodiment of the present technology, it is preferable that, during zooming from the wide-angle end to the telephoto end, the third lens group be moved only unidirectionally toward the object side in the optical axis direction.

By only unidirectionally moving the third lens group toward the object side in the optical axis direction during zooming from the wide-angle end to the telephoto end, it is possible to suppress hysteresis or backlash caused by the components of a lens barrel and an actuator for moving the third lens group during zooming. In particular, it is possible to minimize deterioration in the image quality such as image shaking, image skipping, or blurring occurring during zooming from the wide-angle end to the telephoto end or zooming from the telephoto end to the wide-angle end at the time of photographing a moving image.

It is preferable that the zoom lens according to an embodiment of the present technology satisfy the following Conditional Expression (4).

$$7.0 < fg3/fw < 11.0, \tag{4}$$

where fw is a focal length of a whole optical system at the wide-angle end when focus is at infinity.

Conditional Expression (4) relates to the focal length of the third lens group.

When the result of Conditional Expression (4) is greater than the upper limit thereof, the refractive power of the third lens group excessively decreases, and thus a degree of contribution of power variation of the third lens group to zooming is not sufficient. Thereby, it is difficult to sufficiently reduce the total optical length.

In contrast, when the result of Conditional Expression (4) is less than the lower limit thereof, the refractive power of the third lens group excessively increases, thus an amount of occurrence of various aberrations of the third lens group excessively increases, and aberration correction is difficult. As a result, the image quality is deteriorated.

Accordingly, by making the zoom lens satisfy Conditional Expression (4), the refractive power of the third lens group is appropriately set, the total optical length is sufficiently reduced, and a favorable aberration correction function is secured. Thereby, it is possible to improve the image quality.

In addition, in order to obtain better optical performance, it is preferable that the zoom lens satisfy the following Conditional Expression (4)'.

$$8.0 < fg3/fw < 10.0 \tag{4}'$$

By making the zoom lens satisfy Conditional Expression (4)', the effect of Conditional Expression (4) is further enhanced, the total optical length is further sufficiently reduced, and a favorable aberration correction function is secured. Thereby, it is possible to further improve the image quality.

It is preferable that the zoom lens according to an embodiment of the present technology satisfy the following Conditional Expression (5).

$$0.10 < \{\beta g3(t)/\beta g3(w)\}/\{ft/fw\} < 0.22, \tag{5}$$

where $\beta g3(w)$ is a lateral magnification of the third lens group at the wide-angle end when focus is at infinity, $\beta g3(t)$ is a lateral magnification of the third lens group at the telephoto end when focus is at infinity, fw is a focal length of a whole optical system at the wide-angle end when focus is at infinity, and ft is a focal length of the whole optical system at the telephoto end when focus is at infinity.

Conditional Expression (5) defines the degree of contribution of power variation of the third lens group to zooming.

When the degree of contribution of power variation of the third lens group is greater than the upper limit of Conditional Expression (5), during zooming, an amount of movement of the third lens group excessively increases, or the refractive power of the third lens group excessively increases. In the former case, in order to secure a moving stroke, the total lens length is set to be long. In the latter case, an amount of occurrence of various aberrations of the third lens group excessively increases, and aberration correction is difficult. As a result, the image quality is deteriorated.

In contrast, when the degree of contribution of power variation of the third lens group is less than the lower limit of Conditional Expression (5), it is difficult to achieve an increase in the magnification of the optical system.

Accordingly, by making the zoom lens satisfy Conditional Expression (5), the degree of contribution of power variation of the third lens group is appropriately set, the total lens length is reduced, and a favorable aberration correction function is secured. Thereby, it is possible to improve image quality and increase the magnification of the optical system.

In addition, in order to obtain better optical performance, it is preferable that the zoom lens satisfy the following Conditional Expression (5)'.

$$0.12<\{\beta g3(t)/\beta g3(w)\}/\{ft/fw\}<0.22 \quad (5)'$$

By making the zoom lens satisfy Conditional Expression (5)', the effect of Conditional Expression (5) is further enhanced, the total lens length is further reduced, and a favorable aberration correction function is secured. Thereby, it is possible to further improve image quality and increase the magnification of the optical system.

It is preferable that the zoom lens according to an embodiment of the present technology satisfy the following Conditional Expression (6).

$$0.65<fsl3/fg3<1.05, \quad (6)$$

where fsl3 is a focal length of the cemented lens of the third lens group.

Conditional Expression (6) relates to the focal length of the cemented lens of the third lens group.

When the result of Conditional Expression (6) is greater than the upper limit thereof, the refractive power of the cemented lens excessively decreases. Hence, aberrations of the cemented lens are not appropriately corrected, and the image quality is deteriorated or the refractive power of the third lens group excessively decreases. As a result, the degree of contribution of the third lens group to zooming is not sufficient, and it is difficult to sufficiently reduce the total optical length.

In contrast, when the result of Conditional Expression (6) is less than the lower limit thereof, the refractive power of the cemented lens excessively increases, and thus the amount of occurrence of comatic aberration and lateral chromatic aberration at the wide-angle end corrected by the cemented lens increases. As a result, the image quality is deteriorated.

Accordingly, by making the zoom lens satisfy Conditional Expression (6), the refractive power of the cemented lens of the third lens group is appropriately set, and a favorable correction function of the cemented lens is secured. Thereby, it is possible to improve the image quality and sufficiently reduce the total optical length.

Further, in the zoom lens according to an embodiment of the present technology, it is preferable to secure a function of correcting image blur such as hand shake by shifting the cemented lens of the third lens group in a direction orthogonal to the optical axis direction. In this case, by making a negative lens and the cemented lens of the third lens group satisfy both of Conditional Expressions (1) and (6), it is possible to appropriately set a blur correction coefficient.

By forming the zoom lens in such a manner, even when the zoom ratio of the optical system increases, a length of lens shift necessary for image blur correction does not excessively increase, and thus does not hinder reduction in the size of the entire barrel. In contrast, the length of lens shift does not excessively decrease, and thus it is possible to prevent an error of an actuator shifting the lens from having an adverse effect on the accuracy of image blur correction.

Furthermore, the lens used in the image blur correction is formed of a single element as the cemented lens. Thereby, it is possible to simplify and miniaturize the actuator, and it is possible to appropriately correct particularly lateral chromatic aberration which tends to occur on the telephoto side at the time of blur correction. As a result, it is possible to achieve high image quality.

In addition, in order to obtain better optical performance, it is preferable that the zoom lens satisfy the following Conditional Expression (6)'.

$$0.75<fsl3/fg3<0.95 \quad (6)'$$

By making the zoom lens satisfy Conditional Expression (6)', the effect of Conditional Expression (6) is further enhanced, and a better correction function of the cemented lens is secured. Thereby, it is possible to further improve the image quality, and it is possible to sufficiently reduce the total optical length.

It is preferable that the zoom lens according to an embodiment of the present technology satisfy the following Conditional Expression (7).

$$-0.90<Rsl3/fg3<-0.50, \quad (7)$$

where

Rsl3 is a radius of curvature of a cemented surface of the cemented lens of the third lens group.

Conditional Expression (7) relates to the radius of curvature of the cemented surface of the cemented lens of the third lens group.

When the result of Conditional Expression (7) is less than the lower limit thereof, the curvature of the cemented surface of the cemented lens excessively decreases. Hence, the effect of correction of lateral chromatic aberration of the cemented lens is reduced. As a result, the image quality is deteriorated.

In contrast, when the result of Conditional Expression (7) is greater than the upper limit thereof, the curvature of the cemented surface of the cemented lens excessively increases. Hence, chromatic comatic aberration occurring on the cemented surface excessively increases. As a result, the image quality is deteriorated. Further, when the curvature of the cemented surface excessively increases, a thickness of the cemented lens excessively increases. Hence, besides hindering reduction in the size of the lens, it excessively increases the load to the actuator at the time of lens driving for the image blur correction.

Accordingly, by making the zoom lens satisfy Conditional Expression (7), the curvature of the cemented surface of the cemented lens is appropriately set. Thereby, it is possible to improve the image quality and reduce the size of the lens, and it is possible to reduce the load to the actuator at the time of the image blur correction.

In addition, in order to obtain better optical performance, it is preferable that the zoom lens satisfy the following Conditional Expression (7)'.

$$-0.80<Rsl3/fg3<-0.60 \quad (7)'$$

By making the zoom lens satisfy Conditional Expression (7)', the effect of Conditional Expression (7) is further enhanced. Thus, it is possible to further improve the image quality, it is possible to further reduce the size of the lens, and it is possible to further reduce the load to the actuator at the time of image blur correction.

In the zoom lens according to an embodiment of the present technology, it is preferable that the second lens group include, in order from the object side to the image side, a negative lens, a negative lens, and a cemented lens which has a positive refractive power and is formed of a positive lens positioned on the object side and a negative lens positioned on the image side.

By forming the second lens group in such a manner, a position of the front principal point of the second lens group having the negative refractive power can be disposed to be as close as possible to the object side. Accordingly, a position of an entrance pupil of the optical system at the wide-angle end can be disposed on the object side. In particular, in the optical system of which the imaging angle of view is increased, it is possible to reduce the diameter of the lens which is disposed to be closest to the object side in the zoom lens.

Further, a cemented lens, which has a positive refractive power and is formed of a positive lens positioned on the object side and a negative lens positioned on the image side, is disposed to be closest to the image side of the second lens group. Thereby, chromatic comatic aberration on the wide-angle side and longitudinal chromatic aberration on the telephoto side are appropriately corrected. Accordingly, it is possible to increase the imaging angle of view and the magnification, and it is possible to achieve high image quality even in the zoom lens of which the F number as the relative aperture is increased.

It is preferable that the zoom lens according to an embodiment of the present technology satisfy the following Conditional Expression (8).

$$-3.5 < fg2/fw < -2.0, \tag{8}$$

where fg2 is a focal length of the second lens group, and fw is a focal length of a whole optical system at the wide-angle end when focus is at infinity.

Conditional Expression (8) relates to the focal length of the second lens group.

When the result of Conditional Expression (8) is less than the lower limit thereof, the refractive power of the second lens group excessively decreases. Hence, it is necessary to increase the moving stroke necessary for zooming, and thus it is difficult to reduce the size of the whole lens system, and besides, it is difficult for the position of the entrance pupil of the optical system at the wide-angle end to be disposed to be sufficiently close to the object side. As a result, the diameter of the lens, which is disposed to be closest to the object side in the zoom lens, increases.

In contrast, when the result of Conditional Expression (8) is greater than the upper limit thereof, the refractive power of the second lens group excessively increases, and thus occurrence of curvature of field of the second lens group increases. As a result, the image quality is deteriorated.

Accordingly, by making the zoom lens satisfy Conditional Expression (8), the refractive power of the second lens group is appropriately set. Thereby, it is possible to reduce the size of the whole lens system and reduce the diameter of the lens, which is disposed to be closest to the object side in the zoom lens. In addition, by reducing the curvature of field of the second lens group, it is possible to improve the image quality.

In addition, in order to obtain better optical performance, it is preferable that the zoom lens satisfy the following Conditional Expression (8)'.

$$-3.0 < fg2/fw < -2.4 \tag{8}'$$

By making the zoom lens satisfy Conditional Expression (8)', the effect of Conditional Expression (8) is further enhanced. Thereby, it is possible to further reduce the size of the whole lens system, and it is possible to further reduce the diameter of the lens which is disposed to be closest to the object side in the zoom lens. In addition, by further reducing the curvature of field of the second lens group, it is possible to further improve the image quality.

It is preferable that the zoom lens according to an embodiment of the present technology satisfy the following Conditional Expression (9).

$$-4.5 < fsl2/fg2 < -2.7, \tag{9}$$

where fsl2 is a focal length of a cemented lens of the second lens group, and fg2 is a focal length of the second lens group.

Conditional Expression (9) relates to a focal length of the cemented lens of the second lens group.

When the result of Conditional Expression (9) is less than the lower limit thereof, the refractive power of the cemented lens excessively decreases. Hence, aberrations of the cemented lens are not appropriately corrected. As a result, the image quality is deteriorated.

In contrast, when the result of Conditional Expression (9) is greater than the upper limit thereof, the refractive power of the cemented lens excessively increases, and thus the amount of occurrence of comatic aberration and lateral chromatic aberration at the wide-angle end corrected by the cemented lens increases. As a result, the image quality is deteriorated.

Accordingly, by making the zoom lens satisfy Conditional Expression (9), the refractive power of the cemented lens is appropriately set, and a favorable aberration correction function of the cemented lens is secured. Thereby, it is possible to improve the image quality.

In addition, in order to obtain better optical performance, it is preferable that the zoom lens satisfy the following Conditional Expression (9)'.

$$-4.2 < fsl2/fg2 < -3.0 \tag{9}'$$

By making the zoom lens satisfy Conditional Expression (9)', the effect of Conditional Expression (9) is further enhanced, and a better aberration correction function of the cemented lens is secured. Thereby, it is possible to further improve the image quality.

It is preferable that the zoom lens according to an embodiment of the present technology satisfy the following Conditional Expression (10).

$$1.5 < Rsl2/fg2 < 2.7, \tag{10}$$

where

Rsl2 is a radius of curvature of a cemented surface of a cemented lens of the second lens group, and fg2 is a focal length of the second lens group.

Conditional Expression (10) relates to the radius of curvature of the cemented surface of the cemented lens of the third lens group.

When the result of Conditional Expression (10) is greater than the upper limit thereof, the curvature of the cemented surface of the cemented lens excessively decreases. Hence, the effect of correction of lateral chromatic aberration of the cemented lens on the wide-angle side is reduced. As a result, the image quality is deteriorated.

In contrast, when the result of Conditional Expression (10) is less than the lower limit thereof, the curvature of the cemented surface of the cemented lens excessively increases. Hence, chromatic comatic aberration on the wide-angle side occurring on the cemented surface excessively increases. As a result, the image quality is deteriorated. Further, the curvature of the cemented surface excessively increases, and the thickness of the cemented lens excessively increases. Hence, this hinders reduction in the size of the lens.

Accordingly, by making the zoom lens satisfy Conditional Expression (10), the curvature of the cemented surface of the cemented lens is appropriately set, and the effect of correction of lateral chromatic aberration of the cemented lens on the wide-angle side increases. Thereby, it is possible to improve the image quality, and it is possible to reduce the size of the lens without an excessive increase in the thickness of the cemented lens.

In addition, in order to obtain better optical performance, it is preferable that the zoom lens satisfy the following Conditional Expression (10)'.

$$1.7<Rsl2/fg2<2.5 \tag{10}'$$

By making the zoom lens satisfy Conditional Expression (10)', the effect of Conditional Expression (10) is further enhanced, and a better aberration correction function of the cemented lens is secured. Thereby, it is possible to further improve the image quality, and it is possible to further reduce the size of the cemented lens.

In the zoom lens according to an embodiment of the present technology, it is preferable that the first lens group include, in order from the object side to the image side, a cemented lens which has a negative refractive power and is formed of a negative lens positioned on the object side and a positive lens positioned on the image side, a positive lens, and a positive lens.

By forming the zoom lens in such a manner, it is possible to appropriately correct astigmatism, which is caused by a peripheral image height, even in the optical system of which the angle of view is increased, and besides, it is possible to appropriately correct spherical aberration and longitudinal chromatic aberration on the telephoto side even in the optical system of which the magnification is increased. Hence, it is possible to achieve high image quality.

It is preferable that the zoom lens according to an embodiment of the present technology satisfy the following Conditional Expression (11).

$$15<fg1/fw<23, \tag{11}$$

where fg1 is a focal length of the first lens group, and fw is a focal length of a whole optical system at the wide-angle end when focus is at infinity.

Conditional Expression (11) relates to the focal length of the first lens group.

When the result of Conditional Expression (11) is greater than the upper limit thereof, the refractive power of the first lens group excessively decreases, and thus it is difficult to increase the diameter of the entrance pupil on the telephoto side. As a result, it is difficult for the F number to be set with a sufficient high speed, or the total length of the optical system would increase.

In contrast, when the result of Conditional Expression (11) is less than the lower limit thereof, the refractive power of the first lens group excessively increases, and thus occurrence of astigmatism on the wide-angle side and spherical aberration on the telephoto side excessively increases. As a result, the image quality is deteriorated.

Accordingly, by making the zoom lens satisfy Conditional Expression (11), the refractive power of the first lens group is appropriately set. Thereby, it is possible to set the F number with a high speed and reduce the total length of the optical system, and occurrence of astigmatism on the wide-angle side and spherical aberration on the telephoto side are suppressed. As a result, it is possible to improve the image quality.

In addition, in order to obtain better optical performance, it is preferable that the zoom lens satisfy the following Conditional Expression (11)'.

$$17<fg1/fw<21 \tag{11}'$$

By making the zoom lens satisfy Conditional Expression (11)', the effect of Conditional Expression (11) is further enhanced. Thereby, it is possible to set the F number with a further high speed and further reduce the total length of the optical system, and occurrence of astigmatism on the wide-angle side and spherical aberration on the telephoto side is further suppressed. As a result, it is possible to further improve the image quality.

It is preferable that the zoom lens according to an embodiment of the present technology satisfy the following Conditional Expression (12).

$$-10.5<fsl1/fg1<-5.0, \tag{12}$$

where fsl1 is a focal length of a cemented lens of the first lens group, and fg1 is a focal length of the first lens group.

By making the cemented lens of the first lens group have a negative refractive power as a whole, it is possible to effectively correct astigmatism on the wide-angle side even in the optical system of which the imaging angle of view is increased. Besides, the configuration is favorable for the position of the entrance pupil at the wide-angle end being disposed on the object side. Hence, it is possible to reduce the diameter of the lens which is disposed to be closest to the object side in the zoom lens.

Conditional Expression (12) relates to the focal length of the cemented lens.

When the result of Conditional Expression (12) is less than the lower limit thereof, the refractive power of the cemented lens excessively decreases, and thus the effect of correction of astigmatism decreases. Hence, the image quality is deteriorated, and it is difficult to sufficiently reduce the diameter of the lens which is disposed to be closest to the object side in the zoom lens.

In contrast, when the result of Conditional Expression (12) is greater than the upper limit thereof, the refractive power of the cemented lens excessively increases, and thus occurrence of astigmatism, spherical aberration, and longitudinal chromatic aberration caused by the cemented lens excessively increases. As a result, the image quality is deteriorated.

Accordingly, by making the zoom lens satisfy Conditional Expression (12), the refractive power of the cemented lens is appropriately set, and a favorable aberration correction function of the cemented lens is secured. Thereby, it is possible to improve the image quality, and it is possible to sufficiently reduce the diameter of the lens which is disposed to be closest to the object side in the zoom lens.

In addition, in order to obtain better optical performance, it is preferable that the zoom lens satisfy the following Conditional Expression (12)'.

$$-9.5<fsl1/fg1<-5.5 \tag{12}'$$

By making the zoom lens satisfy Conditional Expression (12)', the effect of Conditional Expression (12) is further enhanced, and a better aberration correction function of the cemented lens is secured. Thereby, it is possible to further improve the image quality, and it is possible to sufficiently reduce the diameter of the lens which is disposed to be closest to the object side in the zoom lens.

In the zoom lens according to an embodiment of the present technology, it is preferable that, during zooming from the wide-angle end to the telephoto end, the fourth lens group be moved in the optical axis direction, and it is preferable that, during focusing, the zoom lens be in focus by moving the fourth lens group in the optical axis direction.

By forming the zoom lens in such a manner, a high magnification is easily achieved with the total length shortened, and besides, it is possible to minimize variation in curvature of field or distortion throughout the entire focus range from infinity focusing to close-up focusing.

In the zoom lens according to an embodiment of the present technology, it is preferable that the third lens group have a function of correcting image blur by shifting the cemented lens in a direction orthogonal to the optical axis direction.

By shifting the cemented lens of the third lens group in the direction orthogonal to the optical axis direction, a favorable blur correction function is secured. As a result, it is possible to improve the image quality. Further, by shifting some elements of the third lens group, it is possible to reduce the load to the actuator at the time of lens driving for the image blur correction, and to reduce the size of the actuator.

In the zoom lens according to an embodiment of the present technology, it is preferable that an aperture stop, which determines an F number, be disposed between the second lens group and the third lens group, and it is preferable that, during zooming, the aperture stop be stationary relative to the imaging surface.

By forming the zoom lens in such a manner, it is not necessary to move an iris unit for driving an iris stop during zooming. Hence, it is possible to reduce the load of the actuator for zooming, and it is not necessary to secure a space in which the iris unit is movable. As a result, it is possible to reduce the size of the entire lens barrel.

Configuration of Different Zoom Lens

A different zoom lens according to the present technology includes, in order from the object side to the image side: a first lens group that has a positive refractive power; a second lens group that has a negative refractive power; a third lens group that has a positive refractive power; and a fourth lens group that has a positive refractive power. Further, in the different zoom lens according to the present technology, during zooming from a wide-angle end to a telephoto end, the first lens group is stationary relative to an imaging surface, and the second lens group is moved to the image side in an optical axis direction so as to decrease a space between the second lens group and the third lens group. Furthermore, in the different zoom lens according to the present technology, the third lens group includes, in order from the object side to the image side, a positive lens, a negative lens, and a cemented lens which has a positive refractive power and is formed of a positive lens positioned on the object side and a negative lens positioned on the image side.

By forming the zoom lens in such a manner, even when the zoom ratio of the optical system is set to be high, it is possible to reduce the total length of the optical system. Besides, it is possible to appropriately correct spherical aberration, comatic aberration, and chromatic aberration of the third lens group. Hence, it becomes easy to achieve an increase in the image quality.

The different zoom lens according to the present technology satisfies the following Conditional Expressions (2) and (3).

$$1.85 < Ndg3\_neg < 1.95, \text{ and} \tag{2}$$

$$20.0 < vdg3\_neg < 30.0, \tag{3}$$

where $Ndg3\_neg$ is a refractive index of glass of the negative lens, which is the second element from the object side in the third lens group, at the d-line, and $vdg3\_neg$ is an Abbe number of the glass of the negative lens, which is the second element from the object side in the third lens group, at the d-line.

Conditional Expression (2) defines the refractive index of glass of the negative lens, which is the second element from the object side in the third lens group, at the d-line.

When the result of Conditional Expression (2) is greater than the upper limit thereof, curvature of a concave lens surface of the negative lens is excessively gentle. Hence, the Petzval curvature is large and negative, and excessively large curvature of field remains on the underside. As a result, the image quality is deteriorated.

In contrast, when the result of Conditional Expression (2) is less than the lower limit thereof, the curvature of the concave lens surface of the negative lens is excessively steep. Hence, the Petzval curvature is greatly biased to the positive side, and excessively large curvature of field occurs on the over side. Alternatively, since the curvature is excessively steep, occurrence of spherical aberration, comatic aberration, and astigmatism of the third lens group excessively increases. As a result, the image quality is deteriorated.

Accordingly, by making the zoom lens satisfy Conditional Expression (2), the radius of curvature of the concave lens surface of the negative lens is appropriately set, and a favorable correction function is secured. Thereby, it is possible to improve the image quality.

In addition, in order to obtain better optical performance, it is preferable that the zoom lens satisfy the following Conditional Expression (2)'.

$$1.875 < Ndg3\_neg < 1.94 \tag{2}'$$

By making the zoom lens satisfy Conditional Expression (2)', the effect of Conditional Expression (2) is further enhanced, and a better correction function is secured. Thereby, it is possible to further improve the image quality.

In addition, in order to obtain further better optical performance, it is preferable that the zoom lens satisfy the following Conditional Expression (2)".

$$1.90 < Ndg3\_neg < 1.93 \tag{2}''$$

By making the zoom lens satisfy Conditional Expression (2)", the effect of Conditional Expression (2) is still further enhanced, and a further better correction function is secured. Thereby, it is possible to still further improve the image quality.

Conditional Expression (3) defines the Abbe number of the glass of the negative lens, which is the second element from the object side in the third lens group, at the d-line.

When the result of Conditional Expression (3) is greater than the upper limit thereof, the color separation effect of the negative lens excessively decreases. Hence, it is difficult to sufficiently correct chromatic aberration of the third lens group having a positive refractive power. As a result, the image quality is deteriorated.

In contrast, when the result of Conditional Expression (3) is less than the lower limit thereof, the color separation effect of the negative lens excessively increases. Hence, chromatic aberration of the third lens group is excessively corrected. As a result, the image quality is deteriorated.

Accordingly, by making the zoom lens satisfy Conditional Expression (3), the color separation effect of the negative lens is appropriately adjusted, and chromatic aberration of the third lens group is satisfactorily corrected. As a result, it is possible to improve the image quality.

In addition, in order to obtain better optical performance, it is preferable that the zoom lens satisfy the following Conditional Expression (3)'.

$$21.0 < vdg3\_neg < 27.0 \quad (3)'$$

By making the zoom lens satisfy Conditional Expression (3)', the effect of Conditional Expression (3) is further enhanced, chromatic aberration of the third lens group is further satisfactorily corrected, and it is possible to further improve the image quality.

In addition, in order to obtain further better optical performance, it is preferable that the zoom lens satisfy the following Conditional Expression (3)".

$$22.0 < vdg3\_neg < 25.0 \quad (3)''$$

By making the zoom lens satisfy Conditional Expression (3)", the effect of Conditional Expression (3) is still further enhanced, chromatic aberration of the third lens group is still further satisfactorily corrected, and it is possible to still further improve the image quality.

Numerical Examples of Zoom Lens

Hereinafter, specific embodiments of the zoom lens according to the technology and numerical examples, in which specific numerical values are applied to the embodiments, will be described with reference to the accompanying drawings and tables.

It should be noted that, in the accompanying drawings and tables, the reference signs and the like are defined as follows.

The "si" indicates an i-th surface counted from the object side to the image side, "ri" indicates a paraxial radius of curvature of the i-th surface, "di" indicates an on-axis surface space between the i-th surface and an (i+1)th surface (the thickness or the air gap at the center of the lens), "Ndi" indicates a refractive index of a lens or the like including the i-th surface at the d-line (λ=587.6 nm), and "vdi" indicates an Abbe number of the lens or the like including the i-th surface at the d-line.

Regarding the "si", "ASP" indicates that the corresponding surface is aspheric, and "STO" indicates that the corresponding surface is an aperture stop. In addition, regarding "ri", "INFINITY" indicates that the corresponding surface is planar.

Regarding "di", "dn (n is a natural number)" indicates variable spacing.

"κ" indicates a conic constant, and "A", "B", "C", and "D" respectively indicate 4th-order, 6th-order, 8th-order, and 10th-order aspheric surface coefficients.

"f" indicates a focal length of the whole optical system, "Fno" indicates an F number, "ω" indicates a half angle of view, and "STOφ" indicates a diameter of the aperture stop.

In addition, in the respective tables showing the aspheric surface coefficients to be described below, the reference sign "E-n" indicates an exponential expression having a base of 10, that is, "10$^{-n}$". For example, "0.12345E-05" indicates "0.12345×10$^{-5}$".

Some zoom lenses used in the embodiments are configured so that the lens surface is formed to be aspheric. Here, it is assumed that "x" is the distance (the sag amount) from the vertex of the lens surface in the direction of the optical axis, "y" is the height (the image height) in the direction perpendicular to the direction of the optical axis, "c" is the paraxial radius of curvature (the inverse of the radius of curvature) at the vertex of the lens, "κ" is the conic constant, and "A", "B", "C", and "D" are respectively the 4th-order, 6th-order, 8th-order, and 10th-order aspheric surface coefficients. Under the assumption, the aspheric surface shape is defined as the following Numerical Expression 1.

$$x = \frac{cy^2}{1 + \{1 - (1+\kappa)c^2 y^2\}^{1/2}} + Ay^4 + By^6 \quad 1$$

First Embodiment

FIG. 1 shows a lens configuration of a zoom lens 1 according to a first embodiment of the present technology.

The zoom lens 1 has a zoom ratio of 22.8 times.

The zoom lens 1 has fourteen lenses, and includes, in order from the object side to the image side: a first lens group G1 that has a positive refractive power; a second lens group G2 that has a negative refractive power; a third lens group G3 that has a positive refractive power; and a fourth lens group G4 that has a positive refractive power.

In the zoom lens 1, during zooming from a wide-angle end to a telephoto end, the first lens group G1 is stationary relative to an imaging surface IMG, and the second lens group G2 is moved to the image side in the optical axis direction so as to decrease a space between the second lens group G2 and the third lens group G3.

In the zoom lens 1, the fourth lens group G4 is formed as a focus lens group that adjusts focus from infinity to the close range by moving the lens group in the optical axis direction during focusing.

The first lens group G1 includes, in order from the object side to the image side: a cemented lens SL1 that is formed by cementing a first lens L1, which has a meniscus shape convex toward the object side and has a negative refractive power, and a second lens L2 which is positioned to be close to the image side of the first lens L1, has a meniscus shape convex toward the object side, and has a positive refractive power; a third lens L3 that has a meniscus shape convex toward the object side and has a positive refractive power; and a fourth lens L4 that has a meniscus shape convex toward the object side and has a positive refractive power. The cemented lens SL1 has a negative refractive power as a whole.

The second lens group G2 includes, in order from the object side to the image side: a fifth lens L5 that has a meniscus shape concave toward the image side and has a negative refractive power; a sixth lens L6 that has a meniscus shape concave toward the object side and has a negative refractive power; and a cemented lens SL2 that is formed by cementing a seventh lens L7, which has a biconvex shape and has a positive refractive power, and an eighth lens L8 which is positioned on the image side of the seventh lens L7, has a meniscus shape concave toward the object side, and has a negative refractive power. The cemented lens SL2 has a positive refractive power as a whole.

The third lens group G3 includes, in order from the object side to the image side: a ninth lens L9 that has a meniscus shape convex toward the object side and has a positive refractive power; a tenth lens L10 that has a meniscus shape convex toward the object side and has a negative refractive power; and a cemented lens SL3 that is formed by cementing an eleventh lens L11, which has a biconvex shape and has a positive refractive power, and a twelfth lens L12 which is positioned on the image side of the eleventh lens L11, has a meniscus shape concave toward the object side, and has a negative refractive power. The cemented lens SL3 has a positive refractive power as a whole.

The fourth lens group G4 includes a cemented lens SL4 that is formed by cementing a thirteenth lens L13, which has a biconvex shape and has a positive refractive power, and a fourteenth lens L14 which is positioned on the image side of the thirteenth lens L13, has a meniscus shape concave toward the object side, and has a negative refractive power. The cemented lens SL4 has a positive refractive power as a whole.

An optical filter OF, a prism block PB, and the imaging surface IMG are arranged on the image side of the fourth lens group G4 in order from the object side to the image side. The prism block PB has a function of separating colors of the optical image.

An aperture stop STO is disposed between the second lens group G2 and the third lens group G3. The aperture stop STO is stationary relative to the imaging surface IMG during zooming.

The cemented lens SL3 of the third lens group G3 is formed as a blur correction group (blur correction lens), and is moved in the direction orthogonal to the optical axis direction at the time of blur correction.

Table 1 shows the lens data of Numerical Example 1 of the zoom lens 1, to which specific numerical values are applied, according to the first embodiment.

TABLE 1

| si | Ri | di | Ndi | vdi |
|---|---|---|---|---|
| 1 | 177.347 | 1.500 | 1.90366 | 31.320 |
| 2 | 57.870 | 9.600 | 1.49700 | 81.608 |
| 3 | 2760.000 | 0.150 | | |
| 4 | 64.500 | 7.130 | 1.59282 | 68.630 |
| 5 | 750.000 | 0.150 | | |
| 6 | 66.400 | 4.200 | 1.80420 | 46.503 |
| 7 | 154.580 | (d7) | | |
| 8 (ASP) | 300.000 | 1.200 | 1.88202 | 37.220 |
| 9 (ASP) | 11.578 | 7.200 | | |
| 10 | −20.051 | 0.600 | 1.88100 | 40.140 |
| 11 | −500.000 | 0.500 | | |
| 12 | 55.00 | 3.700 | 1.92286 | 20.880 |
| 13 | −23.851 | 0.600 | 1.77250 | 49.624 |
| 14 | −420.207 | (d14) | | |
| STO | INFINITY | (d15) | | |
| 16 (ASP) | 15.257 | 3.400 | 1.68893 | 31.161 |
| 17 (ASP) | 54.527 | 4.500 | | |
| 18 | 50.812 | 0.700 | 1.92119 | 23.960 |
| 19 | 15.530 | 2.100 | | |
| 20 (ASP) | 21.004 | 3.500 | 1.49710 | 81.560 |
| 21 | −24.420 | 0.750 | 1.71736 | 29.500 |
| 22 | −38.001 | (d22) | | |
| 23 (ASP) | 24.387 | 4.000 | 1.49710 | 81.560 |

TABLE 1-continued

| si | Ri | di | Ndi | vdi |
|---|---|---|---|---|
| 24 | −15.361 | 0.600 | 1.58144 | 40.890 |
| 25 | −36.671 | (d25) | | |
| 26 | INFINITY | 2.345 | 1.51680 | 64.200 |
| 27 | INFINITY | 1.000 | | |
| 28 | INFINITY | 17.200 | 1.51680 | 64.200 |
| 29 | INFINITY | 0.530 | | |
| IMG | INFINITY | | | |

Table 2 shows the focal length f of the whole optical system, the F number Fno, the half angle of view ω, and the diameter STOφ of the aperture stop STO, together with the variable spacings dn, in Numerical Example 1.

TABLE 2

| | Wide-angle end | Middle focal length | Telephoto end |
|---|---|---|---|
| f | 3.985 | 19.008 | 90.859 |
| Fno | 1.649 | 2.685 | 3.282 |
| ω | 39.01 | 9.23 | 1.96 |
| STO φ | 13.30 | 9.96 | 8.30 |
| d 7 | 1.250 | 34.006 | 52.416 |
| d 14 | 54.692 | 21.936 | 3.526 |
| d 15 | 14.474 | 4.760 | 3.974 |
| d 22 | 4.885 | 8.547 | 8.275 |
| d 25 | 2.181 | 8.232 | 9.291 |

In the zoom lens 1, both surfaces (eighth and ninth surfaces) of the fifth lens L5 of the second lens group G2, both surfaces (sixteenth and seventeenth surfaces) of the ninth lens L9 of the third lens group G3, an object side surface (twentieth surface) of the eleventh lens L11 of the third lens group G3, and an object side surface (twenty-third surface) of the thirteenth lens L13 of the fourth lens group G4 are formed as aspheric surfaces. Table 3 shows the 4th-order, 6th-order, 8th-order, and 10th-order aspheric surface coefficients A, B, C, and D of the aspheric surfaces, together with the conic constant κ, in Numerical Example 1.

TABLE 3

| si | κ | A | B | C | D |
|---|---|---|---|---|---|
| 8 | 0.00000E+00 | 3.12603E−05 | −1.69541E−07 | 2.86110E−10 | 0.00000E+00 |
| 9 | 0.00000E+00 | 2.16528E−05 | 1.07398E−07 | 1.17826E−10 | −1.13279E−11 |
| 16 | 0.00000E+00 | −1.94068E−05 | −4.84188E−08 | −2.12439E−11 | 0.00000E+00 |
| 17 | 0.00000E+00 | −1.00916E−05 | 1.80254E−08 | 2.08346E−10 | 0.00000E+00 |
| 20 | 0.00000E+00 | −2.80295E−05 | 0.00000E+00 | 0.00000E+00 | 0.00000E+00 |
| 23 | 0.00000E+00 | −6.21087E−06 | −2.38981E−08 | 9.43090E−10 | −5.30859E−12 |

Figure 2:
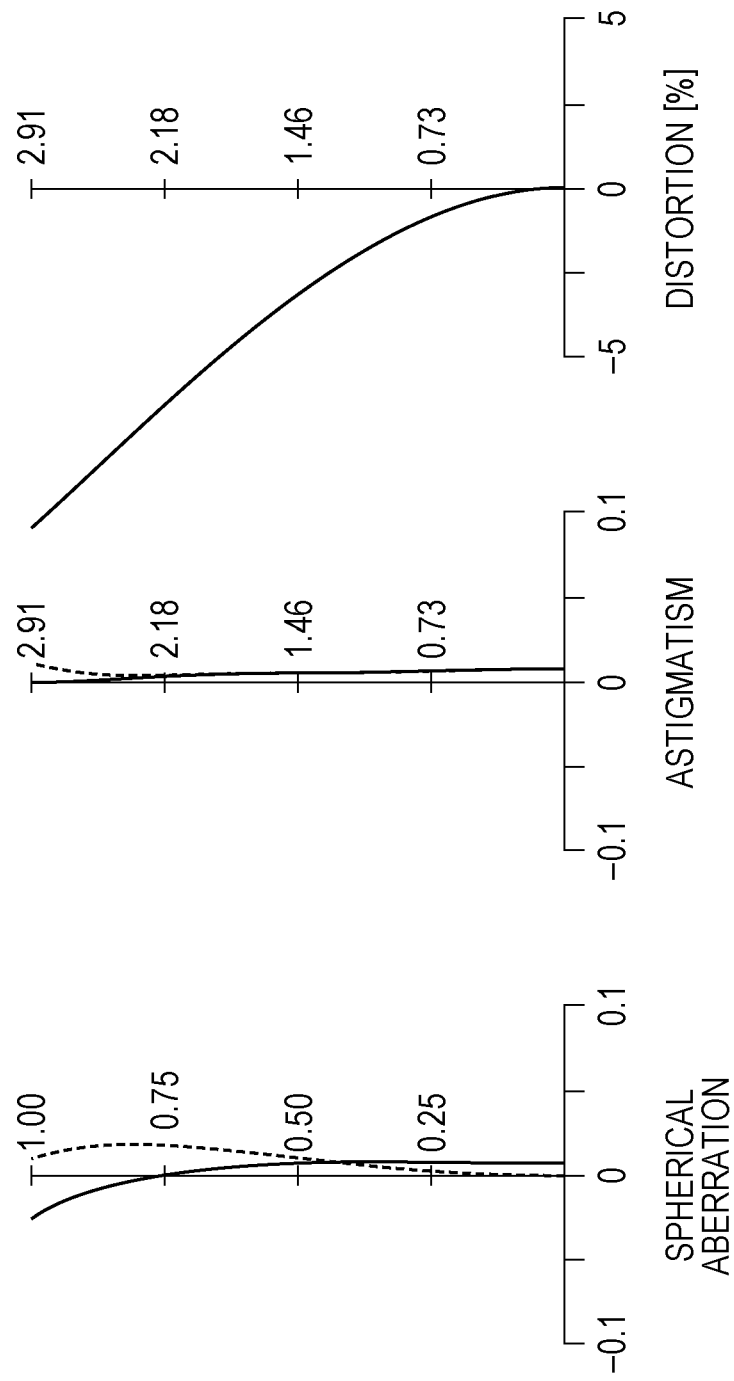
FIG. 2 is a diagram illustrating spherical aberration, astigmatism, and distortion at the wide-angle end in a numerical example in which specific numerical values are applied to the first embodiment.
Figure 3:
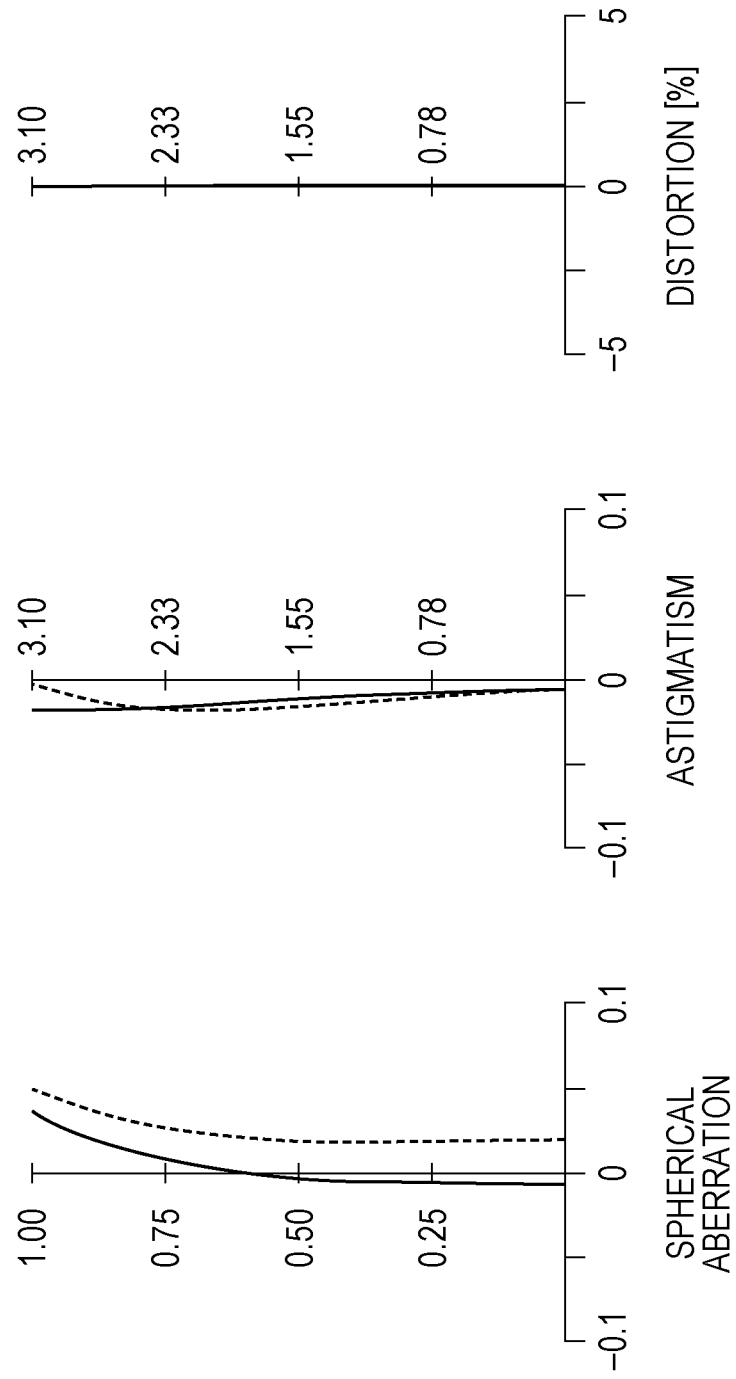
FIG. 3 is a diagram illustrating spherical aberration, astigmatism, and distortion at the telephoto end in the numerical example in which specific numerical values are applied to the first embodiment.

FIG. 2 shows spherical aberration, astigmatism, and distortion at the wide-angle end in Numerical Example 1. FIG. 3 shows spherical aberration, astigmatism, and distortion at the telephoto end in Numerical Example 1.

In each spherical aberration diagram of FIGS. 2 and 3, the solid line indicates the value of the d-line (the wavelength of 587.56 nm), and the dashed line indicates the value of the g-line (the wavelength of 435.84 nm). In each astigmatism diagram, the solid line indicates the value of the d-line on the sagittal image plane, and the dashed line indicates the value of the d-line on the meridional image plane and indicates the value of the d-line in distortion.

As can be clearly seen from the aberration diagrams, in Numerical Example 1, it is possible to obtain an excellent imaging performance by satisfactorily correcting various aberrations.

Second Embodiment

Figure 4:
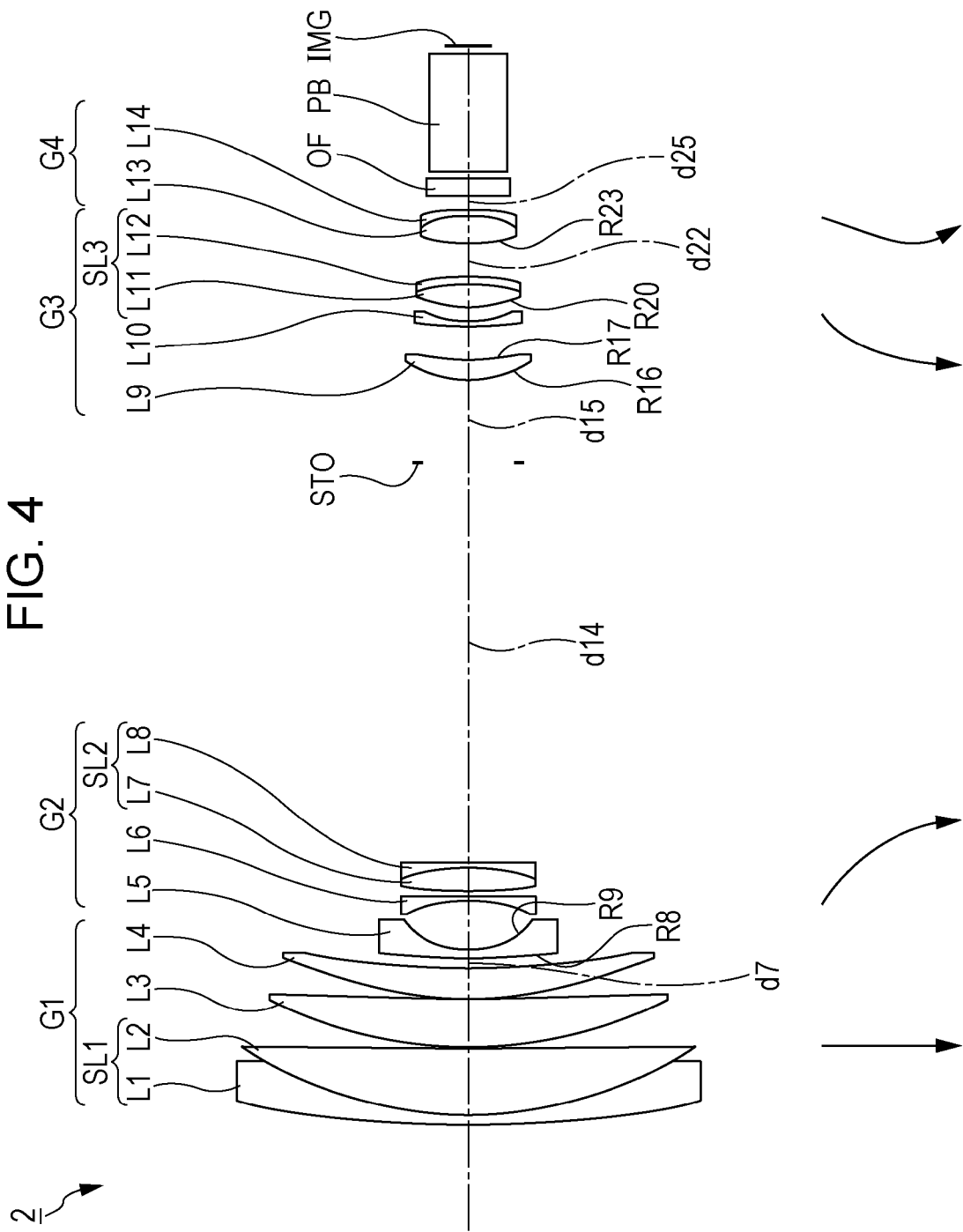
FIG. 4 is a diagram illustrating a lens configuration of a zoom lens according to a second embodiment.

FIG. 4 shows a lens configuration of a zoom lens 2 according to a second embodiment of the present technology.

The zoom lens 2 has a zoom ratio of 22.8 times.

The zoom lens 2 has fourteen lenses, and includes, in order from the object side to the image side: a first lens group G1 that has a positive refractive power; a second lens group G2 that has a negative refractive power; a third lens group G3 that has a positive refractive power; and a fourth lens group G4 that has a positive refractive power.

In the zoom lens 2, during zooming from a wide-angle end to a telephoto end, the first lens group G1 is stationary relative to an imaging surface IMG, and the second lens group G2 is moved to the image side in the optical axis direction so as to decrease a space between the second lens group G2 and the third lens group G3.

In the zoom lens 2, the fourth lens group G4 is formed as a focus lens group that adjusts focus from infinity to the close range by moving the lens group in the optical axis direction during focusing.

The first lens group G1 includes, in order from the object side to the image side: a cemented lens SL1 that is formed by cementing a first lens L1, which has a meniscus shape convex toward the object side and has a negative refractive power, and a second lens L2 which is positioned to be close to the image side of the first lens L1, has a meniscus shape convex toward the object side, and has a positive refractive power; a third lens L3 that has a meniscus shape convex toward the object side and has a positive refractive power; and a fourth lens L4 that has a meniscus shape convex toward the object side and has a positive refractive power. The cemented lens SL1 has a negative refractive power as a whole.

The second lens group G2 includes, in order from the object side to the image side: a fifth lens L5 that has a meniscus shape concave toward the image side and has a negative refractive power; a sixth lens L6 that has a meniscus shape concave toward the object side and has a negative refractive power; and a cemented lens SL2 that is formed by cementing a seventh lens L7, which has a biconvex shape and has a positive refractive power, and an eighth lens L8 which is positioned on the image side of the seventh lens L7, has a meniscus shape concave toward the object side, and has a negative refractive power. The cemented lens SL2 has a positive refractive power as a whole.

The third lens group G3 includes, in order from the object side to the image side: a ninth lens L9 that has a meniscus shape convex toward the object side and has a positive refractive power; a tenth lens L10 that has a meniscus shape convex toward the object side and has a negative refractive power; and a cemented lens SL3 that is formed by cementing an eleventh lens L11, which has a biconvex shape and has a positive refractive power, and a twelfth lens L12 which is positioned on the image side of the eleventh lens L11, has a meniscus shape concave toward the object side, and has a negative refractive power. The cemented lens SL3 has a positive refractive power as a whole.

The fourth lens group G4 includes a cemented lens SL4 that is formed by cementing a thirteenth lens L13, which has a biconvex shape and has a positive refractive power, and a fourteenth lens L14 which is positioned on the image side of the thirteenth lens L13, has a meniscus shape concave toward the object side, and has a negative refractive power. The cemented lens SL4 has a positive refractive power as a whole.

An optical filter OF, a prism block PB, and the imaging surface IMG are arranged on the image side of the fourth lens group G4 in order from the object side to the image side. The prism block PB has a function of separating colors of the optical image.

An aperture stop STO is disposed between the second lens group G2 and the third lens group G3. The aperture stop STO is stationary relative to the imaging surface IMG during zooming.

The cemented lens SL3 of the third lens group G3 is formed as a blur correction group (blur correction lens), and is moved in the direction orthogonal to the optical axis direction at the time of blur correction.

Table 4 shows the lens data of Numerical Example 2 of the zoom lens 2, to which specific numerical values are applied, according to the second embodiment.

TABLE 4

| si | Ri | di | Ndi | vdi |
|---|---|---|---|---|
| 1 | 176.900 | 1.500 | 1.90366 | 31.320 |
| 2 | 57.870 | 9.500 | 1.49700 | 81.608 |
| 3 | 2760.000 | 0.150 | | |
| 4 | 64.400 | 7.130 | 1.59282 | 68.630 |
| 5 | 764.000 | 0.150 | | |
| 6 | 66.400 | 4.180 | 1.80420 | 46.503 |
| 7 | 153.000 | (d7) | | |
| 8 (ASP) | 300.000 | 1.200 | 1.88202 | 37.220 |
| 9 (ASP) | 11.515 | 7.210 | | |
| 10 | −20.000 | 0.600 | 1.88100 | 40.140 |
| 11 | −750.000 | 0.500 | | |
| 12 | 55.00 | 3.700 | 1.92286 | 20.880 |
| 13 | −24.000 | 0.600 | 1.77250 | 49.624 |
| 14 | −278.000 | (d14) | | |
| STO | INFINITY | (d15) | | |
| 16 (ASP) | 15.212 | 3.000 | 1.68893 | 31.161 |
| 17 (ASP) | 53.844 | 4.800 | | |
| 18 | 49.560 | 0.700 | 1.92119 | 23.960 |
| 19 | 15.530 | 2.100 | | |
| 20 (ASP) | 21.117 | 3.500 | 1.49710 | 81.560 |
| 21 | −24.900 | 0.750 | 1.71736 | 29.500 |
| 22 | −38.240 | (d22) | | |
| 23 (ASP) | 24.524 | 4.000 | 1.49710 | 81.560 |
| 24 | −14.900 | 0.600 | 1.58144 | 40.890 |
| 25 | −36.800 | (d25) | | |
| 26 | INFINITY | 2.345 | 1.51680 | 64.200 |
| 27 | INFINITY | 1.000 | | |
| 28 | INFINITY | 17.200 | 1.51680 | 64.200 |
| 29 | INFINITY | 0.530 | | |
| IMG | INFINITY | | | |

Table 5 shows the focal length f of the whole optical system, the F number Fno, the half angle of view ω, and the diameter STOϕ of the aperture stop STO, together with the variable spacings dn, in Numerical Example 2.

TABLE 5

| | Wide-angle end | Middle focal length | Telephoto end |
|---|---|---|---|
| f | 3.985 | 18.993 | 90.863 |
| Fno | 1.649 | 2.755 | 3.295 |

TABLE 5-continued

|  | Wide-angle end | Middle focal length | Telephoto end |
|---|---|---|---|
| ω | 39.01 | 9.24 | 1.96 |
| STO φ | 13.80 | 10.30 | 8.80 |
| d 7 | 1.250 | 34.040 | 52.491 |
| d 14 | 57.521 | 24.732 | 6.280 |
| d 15 | 11.720 | 2.013 | 1.220 |
| d 22 | 4.841 | 8.535 | 8.276 |
| d 25 | 2.190 | 8.203 | 9.255 |

In the zoom lens 2, both surfaces (eighth and ninth surfaces) of the fifth lens L5 of the second lens group G2, both surfaces (sixteenth and seventeenth surfaces) of the ninth lens L9 of the third lens group G3, an object side surface (twentieth surface) of the eleventh lens L11 of the third lens group G3, and an object side surface (twenty-third surface) of the thirteenth lens L13 of the fourth lens group G4 are formed as aspheric surfaces. Table 6 shows the 4th-order, 6th-order, 8th-order, and 10th-order aspheric surface coefficients A, B, C, and D of the aspheric surfaces, together with the conic constant κ, in Numerical Example 2.

TABLE 6

| si | κ | A | B | C | D |
|---|---|---|---|---|---|
| 8 | 0.00000E+00 | 3.14751E−05 | −1.70919E−07 | 2.94821E−10 | 0.00000E+00 |
| 9 | 0.00000E+00 | 2.16528E−05 | 1.07398E−07 | 1.17826E−10 | −1.13279E−11 |
| 16 | 0.00000E+00 | −1.92619E−05 | −5.76624E−08 | 4.96538E−12 | 0.00000E+00 |
| 17 | 0.00000E+00 | −9.14592E−06 | 5.88703E−09 | 2.43982E−10 | 0.00000E+00 |
| 20 | 0.00000E+00 | −2.75891E−05 | 0.00000E+00 | 0.00000E+00 | 0.00000E+00 |
| 23 | 0.00000E+00 | −4.89691E−06 | −3.09128E−08 | 1.48587E−09 | −1.11170E−11 |

Figure 5:
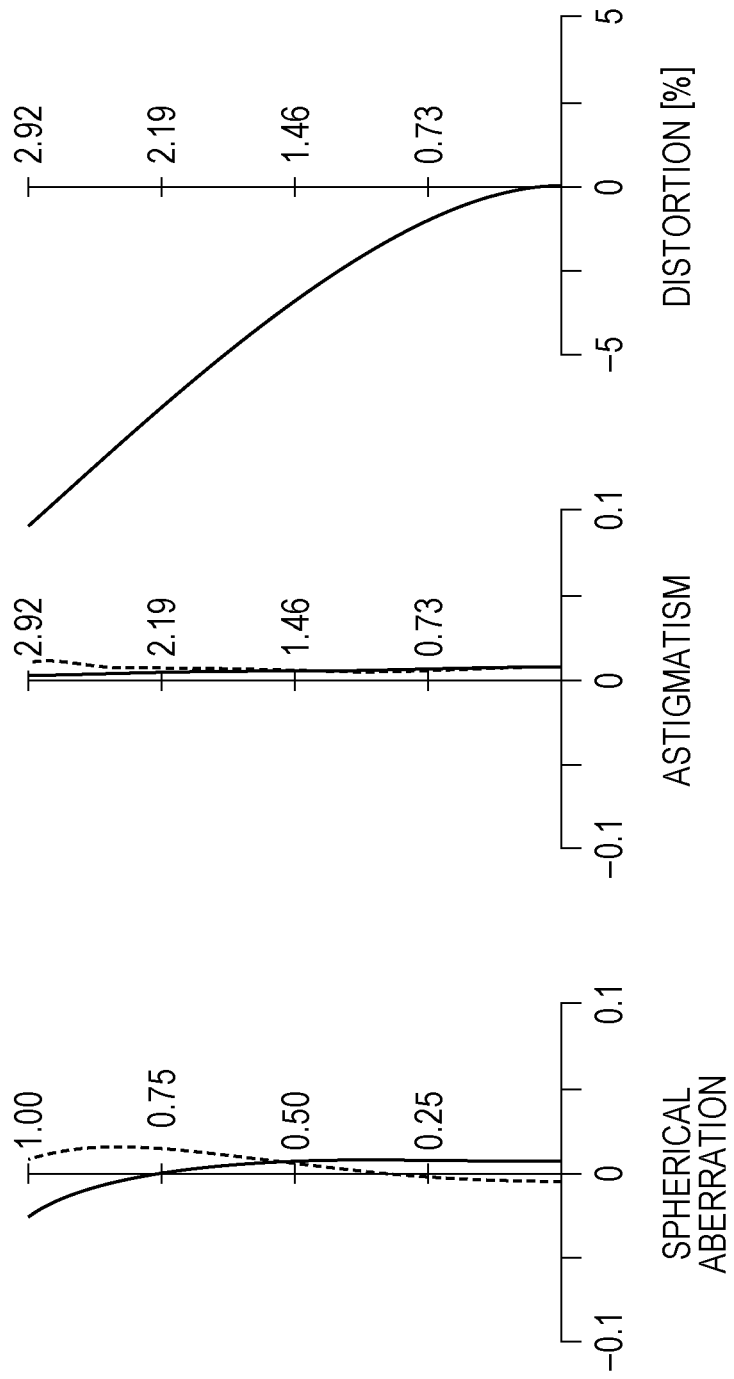
FIG. 5 is a diagram illustrating spherical aberration, astigmatism, and distortion at the wide-angle end in a numerical example in which specific numerical values are applied to the second embodiment.
Figure 6:
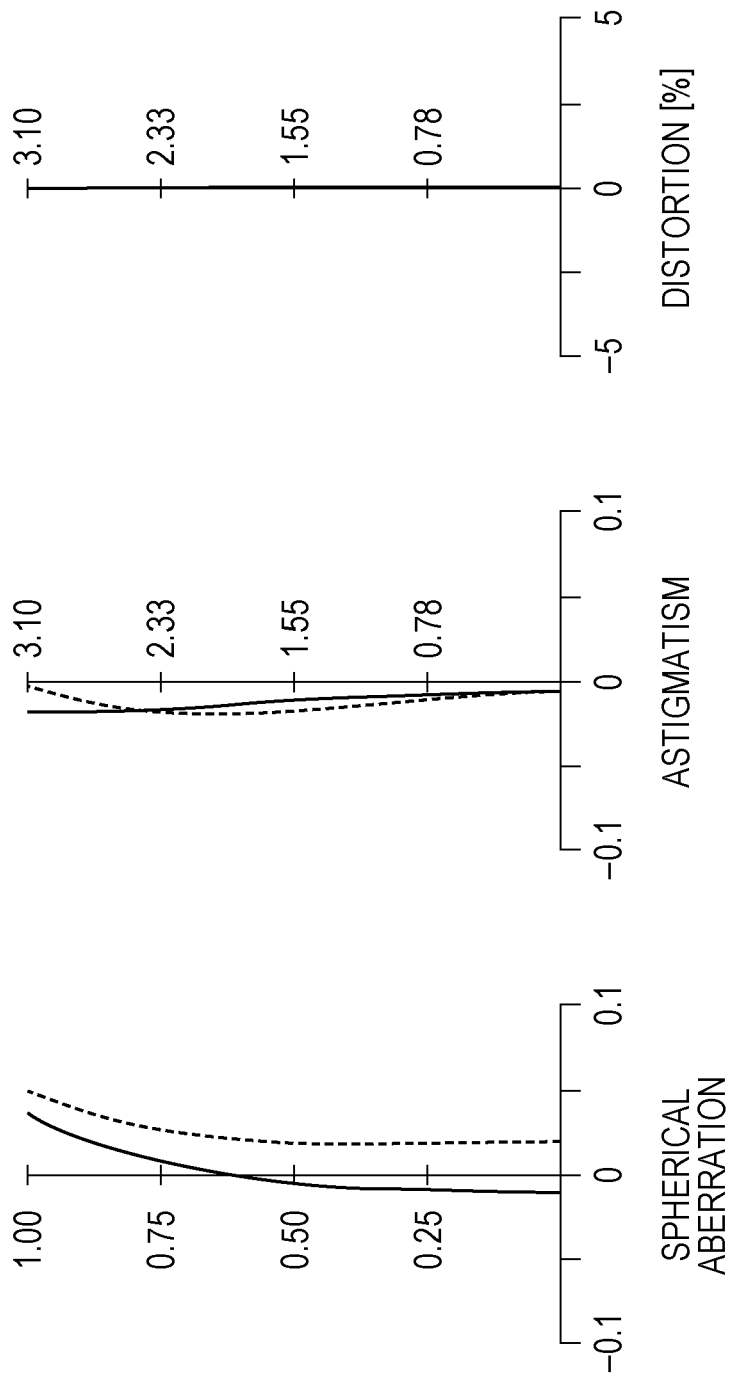
FIG. 6 is a diagram illustrating spherical aberration, astigmatism, and distortion at the telephoto end in the numerical example in which specific numerical values are applied to the second embodiment.

FIG. 5 shows spherical aberration, astigmatism, and distortion at the wide-angle end in Numerical Example 2. FIG. 6 shows spherical aberration, astigmatism, and distortion at the telephoto end in Numerical Example 2.

In each spherical aberration diagram of FIGS. 5 and 6, the solid line indicates the value of the d-line (the wavelength of 587.56 nm), and the dashed line indicates the value of the g-line (the wavelength of 435.84 nm). In each astigmatism diagram, the solid line indicates the value of the d-line on the sagittal image plane, and the dashed line indicates the value of the d-line on the meridional image plane and indicates the value of the d-line in distortion.

As can be clearly seen from the aberration diagrams, in Numerical Example 2, it is possible to obtain an excellent imaging performance by satisfactorily correcting various aberrations.

Third Embodiment

Figure 7:
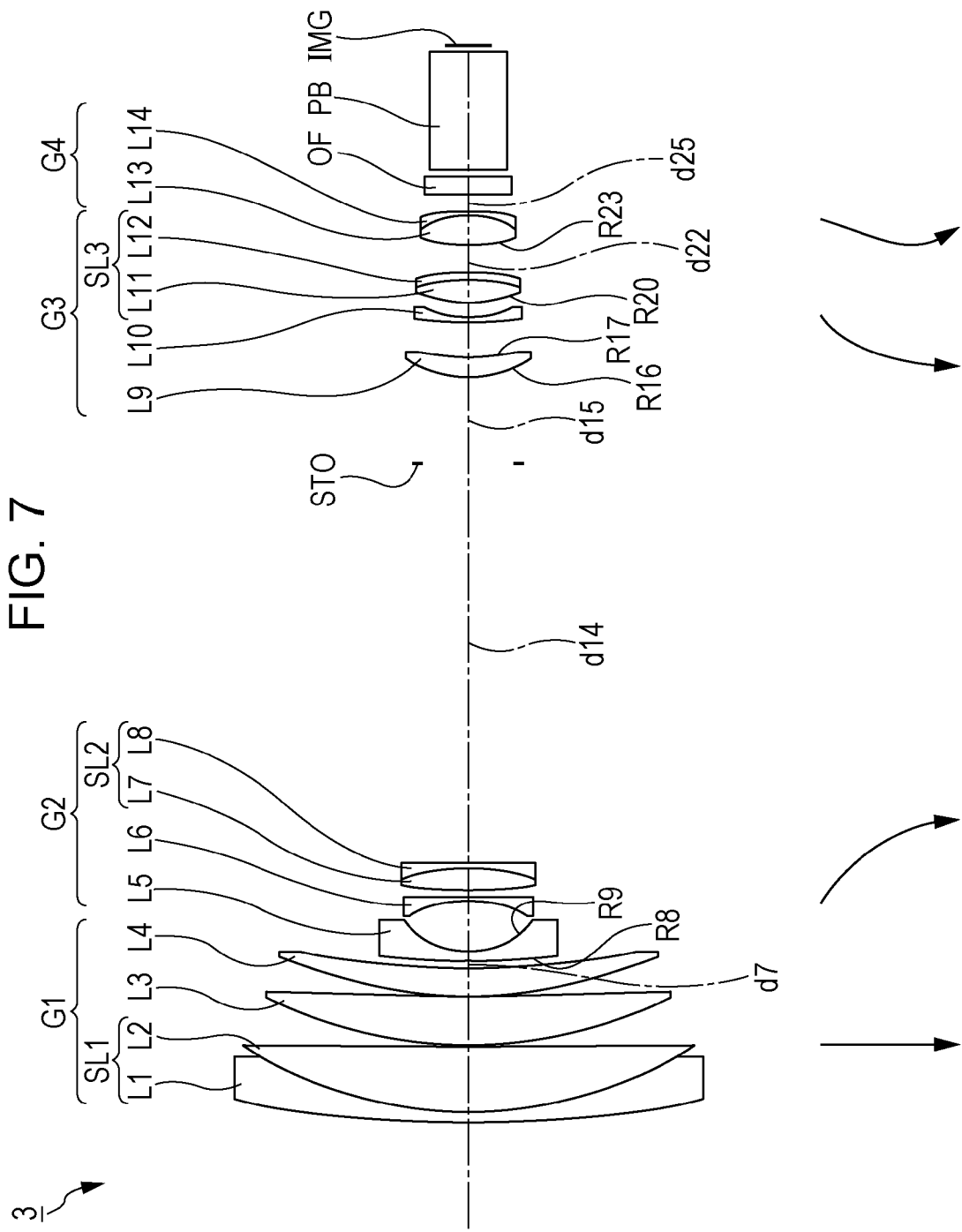
FIG. 7 is a diagram illustrating a lens configuration of a zoom lens according to a third embodiment.

FIG. 7 shows a lens configuration of a zoom lens 3 according to a third embodiment of the present technology.

The zoom lens 3 has a zoom ratio of 22.8 times.

The zoom lens 3 has fourteen lenses, and includes, in order from the object side to the image side: a first lens group G1 that has a positive refractive power; a second lens group G2 that has a negative refractive power; a third lens group G3 that has a positive refractive power; and a fourth lens group G4 that has a positive refractive power.

In the zoom lens 3, during zooming from a wide-angle end to a telephoto end, the first lens group G1 is stationary relative to an imaging surface IMG, and the second lens group G2 is moved to the image side in the optical axis direction so as to decrease a space between the second lens group G2 and the third lens group G3.

In the zoom lens 3, the fourth lens group G4 is formed as a focus lens group that adjusts focus from infinity to the close range by moving the lens group in the optical axis direction during focusing.

The first lens group G1 includes, in order from the object side to the image side: a cemented lens SL1 that is formed by cementing a first lens L1, which has a meniscus shape convex toward the object side and has a negative refractive power, and a second lens L2 which is positioned to be close to the image side of the first lens L1, has a meniscus shape convex toward the object side, and has a positive refractive power; a third lens L3 that has a meniscus shape convex toward the object side and has a positive refractive power; and a fourth lens L4 that has a meniscus shape convex toward the object side and has a positive refractive power. The cemented lens SL1 has a negative refractive power as a whole.

The second lens group G2 includes, in order from the object side to the image side: a fifth lens L5 that has a meniscus shape concave toward the image side and has a negative refractive power; a sixth lens L6 that has a meniscus shape concave toward the object side and has a negative refractive power; and a cemented lens SL2 that is formed by cementing a seventh lens L7, which has a biconvex shape and has a positive refractive power, and an eighth lens L8 which is positioned on the image side of the seventh lens L7, has a meniscus shape concave toward the object side, and has a negative refractive power. The cemented lens SL2 has a positive refractive power as a whole.

The third lens group G3 includes, in order from the object side to the image side: a ninth lens L9 that has a meniscus shape convex toward the object side and has a positive refractive power; a tenth lens L10 that has a meniscus shape convex toward the object side and has a negative refractive power; and a cemented lens SL3 that is formed by cementing an eleventh lens L11, which has a biconvex shape and has a positive refractive power, and a twelfth lens L12 which is positioned on the image side of the eleventh lens L11, has a meniscus shape concave toward the object side, and has a negative refractive power. The cemented lens SL3 has a positive refractive power as a whole.

The fourth lens group G4 includes a cemented lens SL4 that is formed by cementing a thirteenth lens L13, which has a biconvex shape and has a positive refractive power, and a fourteenth lens L14 which is positioned on the image side of the thirteenth lens L13, has a meniscus shape concave toward the object side, and has a negative refractive power. The cemented lens SL4 has a positive refractive power as a whole.

An optical filter OF, a prism block PB, and the imaging surface IMG are arranged on the image side of the fourth lens group G4 in order from the object side to the image side. The prism block PB has a function of separating colors of the optical image.

An aperture stop STO is disposed between the second lens group G2 and the third lens group G3. The aperture stop STO is stationary relative to the imaging surface IMG during zooming.

The cemented lens SL3 of the third lens group G3 is formed as a blur correction group (blur correction lens), and is moved in the direction orthogonal to the optical axis direction at the time of blur correction.

Table 7 shows the lens data of Numerical Example 3 of the zoom lens 3, to which specific numerical values are applied, according to the third embodiment.

TABLE 7

| si | Ri | di | Ndi | vdi |
|---|---|---|---|---|
| 1 | 166.083 | 1.500 | 1.90366 | 31.320 |
| 2 | 57.500 | 9.500 | 1.49700 | 81.608 |
| 3 | 2760.000 | 0.150 | | |
| 4 | 63.138 | 7.100 | 1.59282 | 68.630 |
| 5 | 550.886 | 0.150 | | |
| 6 | 68.087 | 4.060 | 1.80420 | 46.503 |
| 7 | 155.167 | (d7) | | |
| 8 (ASP) | 300.000 | 1.200 | 1.88202 | 37.220 |
| 9 (ASP) | 11.737 | 7.333 | | |
| 10 | −20.000 | 0.600 | 1.88100 | 40.140 |
| 11 | 1500.000 | 0.597 | | |
| 12 | 60.00 | 3.700 | 1.92286 | 20.880 |

TABLE 7-continued

| si | Ri | di | Ndi | vdi |
|---|---|---|---|---|
| 13 | −23.873 | 0.600 | 1.77250 | 49.624 |
| 14 | −158.962 | (d14) | | |
| STO | INFINITY | (d15) | | |
| 16 (ASP) | 15.137 | 3.000 | 1.68893 | 31.161 |
| 17 (ASP) | 42.191 | 5.050 | | |
| 18 | 40.000 | 0.700 | 1.92119 | 23.960 |
| 19 | 15.530 | 2.000 | | |
| 20 (ASP) | 20.677 | 3.500 | 1.49710 | 81.560 |
| 21 | −26.537 | 0.750 | 1.71736 | 29.500 |
| 22 | −41.421 | (d22) | | |
| 23 (ASP) | 25.153 | 4.000 | 1.49710 | 81.560 |
| 24 | −14.289 | 0.600 | 1.58144 | 40.890 |
| 25 | −37.110 | (d25) | | |
| 26 | INFINITY | 2.345 | 1.51680 | 64.200 |
| 27 | INFINITY | 1.000 | | |
| 28 | INFINITY | 17.200 | 1.51680 | 64.200 |
| 29 | INFINITY | 0.530 | | |
| IMG | INFINITY | | | |

Table 8 shows the focal length f of the whole optical system, the F number Fno, the half angle of view ω, and the diameter STOϕ of the aperture stop STO, together with the variable spacings dn, in Numerical Example 3.

TABLE 8

| | Wide-angle end | Middle focal length | Telephoto end |
|---|---|---|---|
| f | 3.985 | 19.011 | 90.860 |
| Fno | 1.651 | 2.748 | 3.295 |

TABLE 8-continued

| | Wide-angle end | Middle focal length | Telephoto end |
|---|---|---|---|
| ω | 39.02 | 9.23 | 1.96 |
| STO ϕ | 13.76 | 10.30 | 8.80 |
| d 7 | 1.000 | 34.070 | 52.635 |
| d 14 | 57.635 | 24.564 | 6.000 |
| d 15 | 12.000 | 2.383 | 1.500 |
| d 22 | 4.839 | 8.107 | 7.921 |
| d 25 | 2.464 | 8.363 | 9.432 |

In the zoom lens 3, both surfaces (eighth and ninth surfaces) of the fifth lens L5 of the second lens group G2, both surfaces (sixteenth and seventeenth surfaces) of the ninth lens L9 of the third lens group G3, an object side surface (twentieth surface) of the eleventh lens L11 of the third lens group G3, and an object side surface (twenty-third surface) of the thirteenth lens L13 of the fourth lens group G4 are formed as aspheric surfaces. Table 9 shows the 4th-order, 6th-order, 8th-order, and 10th-order aspheric surface coefficients A, B, C, and D of the aspheric surfaces, together with the conic constant κ, in Numerical Example 3.

TABLE 9

| si | κ | A | B | C | D |
|---|---|---|---|---|---|
| 8 | 0.00000E+00 | 2.78216E−05 | −1.23789E−07 | 1.69197E−10 | 0.00000E+00 |
| 9 | 0.00000E+00 | 1.74107E−05 | 1.22666E−07 | 6.23496E−11 | −1.61663E−13 |
| 16 | 0.00000E+00 | −1.98982E−05 | −3.90183E−08 | −8.43264E−11 | 0.00000E+00 |
| 17 | 0.00000E+00 | −9.74896E−06 | 2.81639E−08 | 1.12022E−10 | 0.00000E+00 |
| 20 | 0.00000E+00 | −2.73508E−05 | 0.00000E+00 | 0.00000E+00 | 0.00000E+00 |
| 23 | 0.00000E+00 | −2.83792E−06 | −4.50346E−09 | 6.69344E−10 | −3.15191E−12 |

Figure 8:
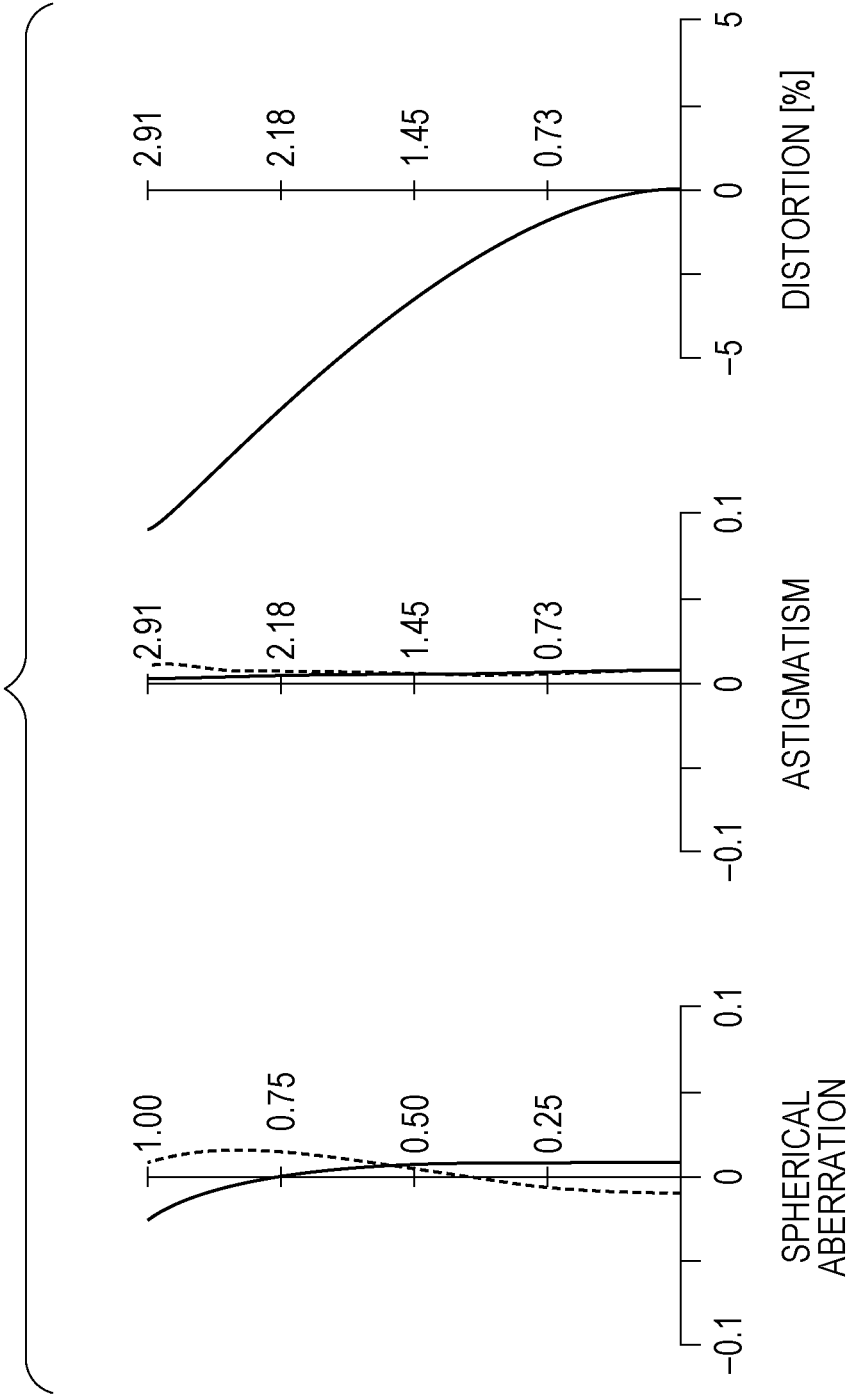
FIG. 8 is a diagram illustrating spherical aberration, astigmatism, and distortion at the wide-angle end in a numerical example in which specific numerical values are applied to the third embodiment.
Figure 9:
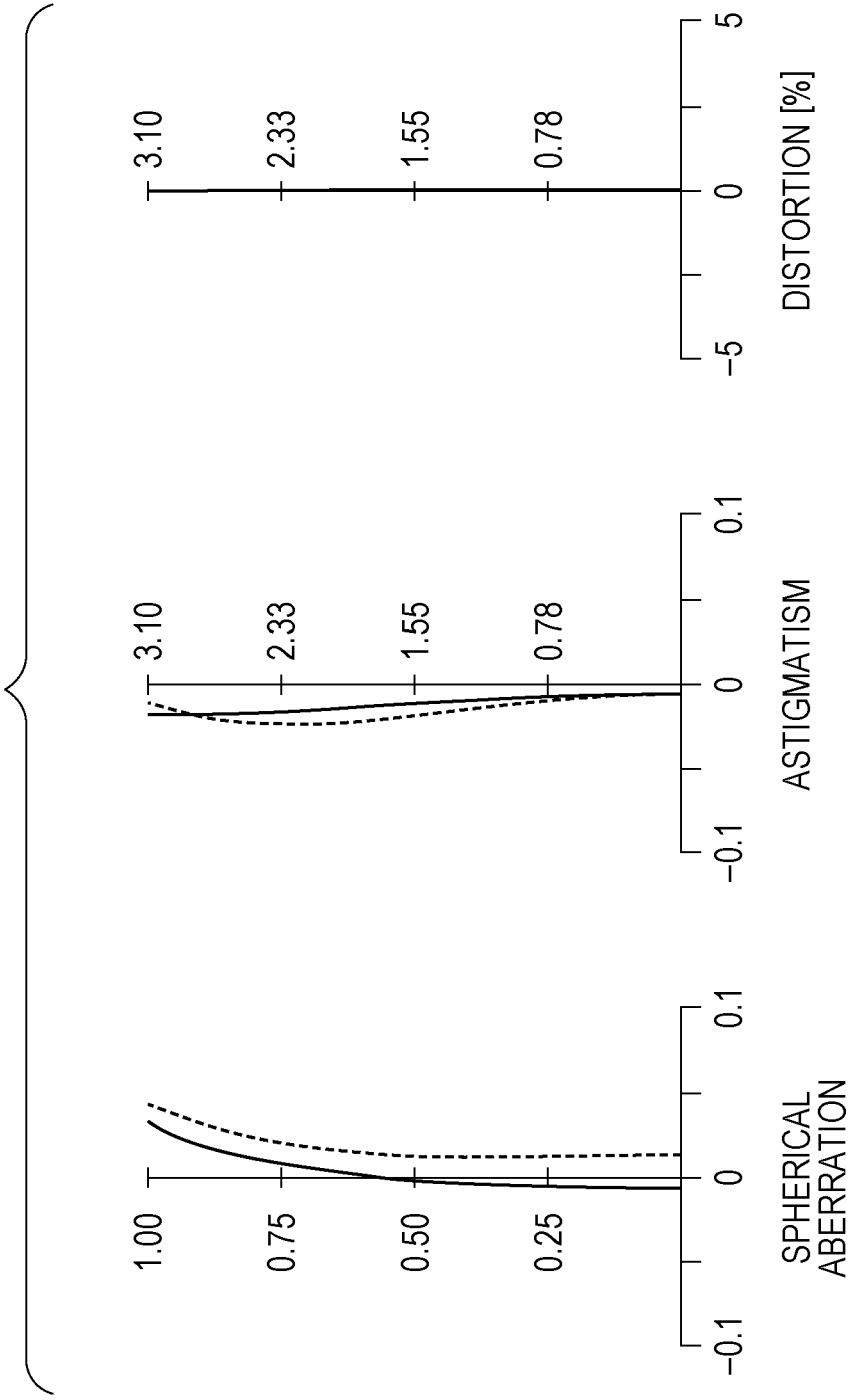
FIG. 9 is a diagram illustrating spherical aberration, astigmatism, and distortion at the telephoto end in the numerical example in which specific numerical values are applied to the third embodiment.

FIG. 8 shows spherical aberration, astigmatism, and distortion at the wide-angle end in Numerical Example 3. FIG. 9 shows spherical aberration, astigmatism, and distortion at the telephoto end in Numerical Example 3.

In each spherical aberration diagram of FIGS. 8 and 9, the solid line indicates the value of the d-line (the wavelength of 587.56 nm), and the dashed line indicates the value of the g-line (the wavelength of 435.84 nm). In each astigmatism diagram, the solid line indicates the value of the d-line on the sagittal image plane, and the dashed line indicates the value of the d-line on the meridional image plane and indicates the value of the d-line in distortion.

As can be clearly seen from the aberration diagrams, in Numerical Example 3, it is possible to obtain an excellent imaging performance by satisfactorily correcting various aberrations.

Fourth Embodiment

Figure 10:
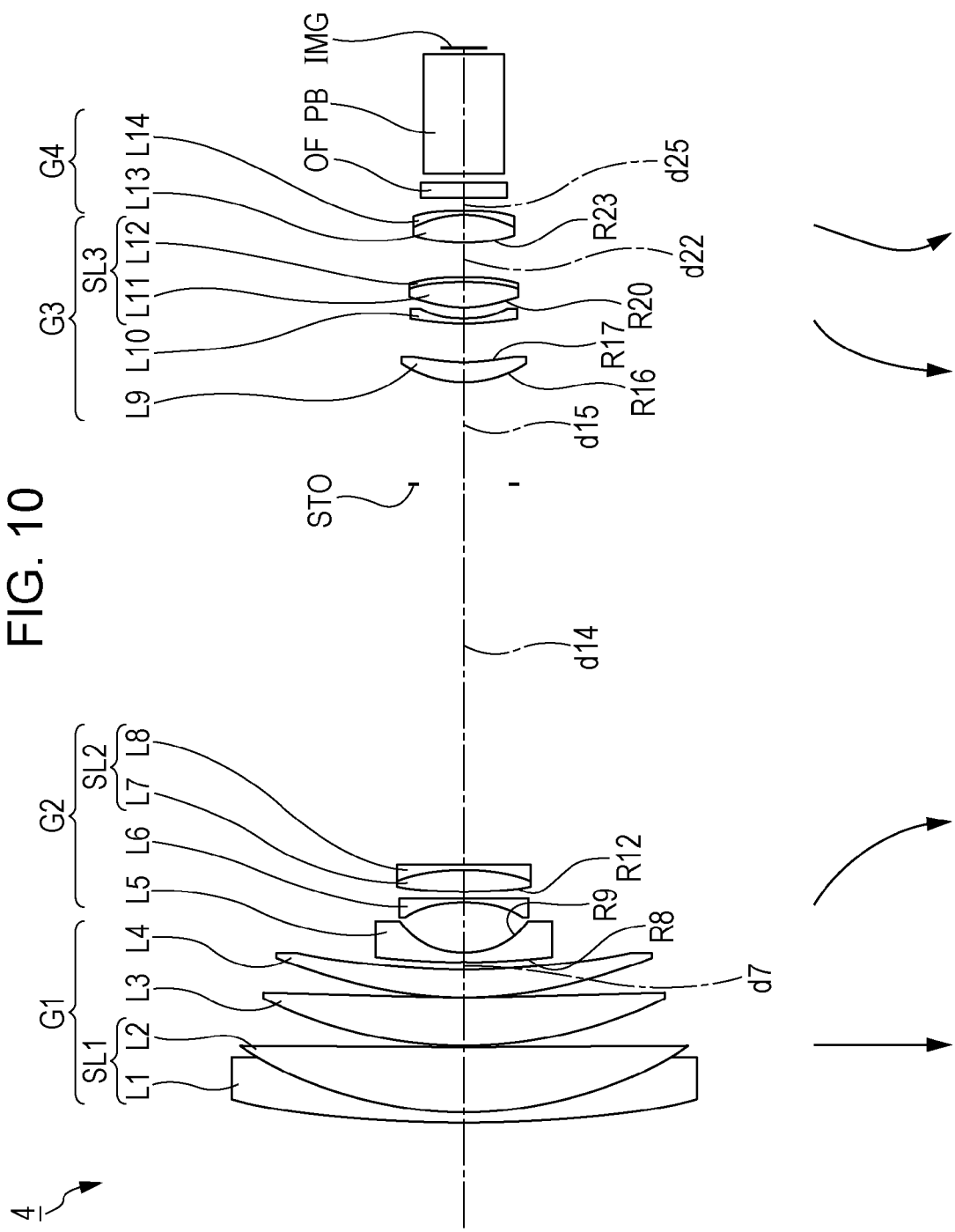
FIG. 10 is a diagram illustrating a lens configuration of a zoom lens according to a fourth embodiment.

FIG. 10 shows a lens configuration of a zoom lens 4 according to a fourth embodiment of the present technology.

The zoom lens 4 has a zoom ratio of 22.8 times.

The zoom lens 4 has fourteen lenses, and includes, in order from the object side to the image side: a first lens group G1 that has a positive refractive power; a second lens group G2 that has a negative refractive power; a third lens group G3 that has a positive refractive power; and a fourth lens group G4 that has a positive refractive power.

In the zoom lens 4, during zooming from a wide-angle end to a telephoto end, the first lens group G1 is stationary relative to an imaging surface IMG, and the second lens group G2 is moved to the image side in the optical axis direction so as to decrease a space between the second lens group G2 and the third lens group G3.

In the zoom lens 4, the fourth lens group G4 is formed as a focus lens group that adjusts focus from infinity to the close range by moving the lens group in the optical axis direction during focusing.

The first lens group G1 includes, in order from the object side to the image side: a cemented lens SL1 that is formed by cementing a first lens L1, which has a meniscus shape convex toward the object side and has a negative refractive power, and a second lens L2 which is positioned to be close to the image side of the first lens L1, has a meniscus shape convex toward the object side, and has a positive refractive power; a third lens L3 that has a meniscus shape convex toward the object side and has a positive refractive power; and a fourth lens L4 that has a meniscus shape convex toward the object side and has a positive refractive power. The cemented lens SL1 has a negative refractive power as a whole.

The second lens group G2 includes, in order from the object side to the image side: a fifth lens L5 that has a meniscus shape concave toward the image side and has a negative refractive power; a sixth lens L6 that has a biconcave shape and has a negative refractive power; and a cemented lens SL2 that is formed by cementing a seventh lens L7, which has a biconvex shape and has a positive refractive power, and an eighth lens L8 which is positioned on the image side of the seventh lens L7, has a meniscus shape concave toward the object side, and has a negative refractive power. The cemented lens SL2 has a positive refractive power as a whole.

The third lens group G3 includes, in order from the object side to the image side: a ninth lens L9 that has a meniscus shape convex toward the object side and has a positive refractive power; a tenth lens L10 that has a meniscus shape convex toward the object side and has a negative refractive power; and a cemented lens SL3 that is formed by cementing an eleventh lens L11, which has a biconvex shape and has a positive refractive power, and a twelfth lens L12 which is positioned on the image side of the eleventh lens L11, has a meniscus shape concave toward the object side, and has a negative refractive power. The cemented lens SL3 has a positive refractive power as a whole.

The fourth lens group G4 includes a cemented lens SL4 that is formed by cementing a thirteenth lens L13, which has a biconvex shape and has a positive refractive power, and a fourteenth lens L14 which is positioned on the image side of the thirteenth lens L13, has a meniscus shape concave toward the object side, and has a negative refractive power. The cemented lens SL4 has a positive refractive power as a whole.

An optical filter OF, a prism block PB, and the imaging surface IMG are arranged on the image side of the fourth lens group G4 in order from the object side to the image side. The prism block PB has a function of separating colors of the optical image.

An aperture stop STO is disposed between the second lens group G2 and the third lens group G3. The aperture stop STO is stationary relative to the imaging surface IMG during zooming.

The cemented lens SL3 of the third lens group G3 is formed as a blur correction group (blur correction lens), and is moved in the direction orthogonal to the optical axis direction at the time of blur correction.

Table 10 shows the lens data of Numerical Example 4 of the zoom lens 4, to which specific numerical values are applied, according to the fourth embodiment.

TABLE 10

| si | Ri | di | Ndi | vdi |
|---|---|---|---|---|
| 1 | 157.744 | 1.600 | 1.90366 | 31.320 |
| 2 | 57.000 | 9.400 | 1.49700 | 81.608 |
| 3 | 2760.000 | 0.150 | | |
| 4 | 62.081 | 7.097 | 1.59282 | 68.630 |
| 5 | 493.391 | 0.150 | | |
| 6 | 69.988 | 3.934 | 1.80420 | 46.503 |
| 7 | 157.174 | (d7) | | |
| 8 (ASP) | 180.409 | 1.200 | 1.88202 | 37.220 |
| 9 (ASP) | 11.619 | 7.120 | | |
| 10 | −23.000 | 0.600 | 1.88100 | 40.140 |
| 11 | 190.368 | 0.500 | | |
| 12 (ASP) | 63.50 | 3.700 | 1.92286 | 20.880 |
| 13 | −23.011 | 0.600 | 1.77250 | 49.624 |
| 14 | −217.570 | (d14) | | |
| STO | INFINITY | (d15) | | |
| 16 (ASP) | 14.940 | 2.700 | 1.68893 | 31.161 |
| 17 (ASP) | 33.101 | 5.700 | | |
| 18 | 32.427 | 0.580 | 1.92119 | 23.960 |
| 19 | 15.500 | 1.500 | | |
| 20 (ASP) | 19.835 | 3.800 | 1.49710 | 81.560 |
| 21 | −25.921 | 0.700 | 1.71736 | 29.500 |
| 22 | −42.671 | (d22) | | |
| 23 (ASP) | 23.729 | 4.000 | 1.49710 | 81.560 |
| 24 | −15.297 | 0.600 | 1.58144 | 40.890 |
| 25 | −40.633 | (d25) | | |
| 26 | INFINITY | 2.345 | 1.51680 | 64.200 |
| 27 | INFINITY | 1.000 | | |
| 28 | INFINITY | 17.200 | 1.51680 | 64.200 |
| 29 | INFINITY | 0.530 | | |
| IMG | INFINITY | | | |

Table 11 shows the focal length f of the whole optical system, the F number Fno, the half angle of view ω, and the diameter STOφ of the aperture stop STO, together with the variable spacings dn, in Numerical Example 4.

TABLE 11

| | Wide-angle end | Middle focal length | Telephoto end |
|---|---|---|---|
| f | 3.985 | 19.012 | 90.862 |
| Fno | 1.649 | 2.634 | 3.283 |
| ω | 39.09 | 9.24 | 1.96 |
| STO φ | 13.10 | 10.00 | 8.20 |
| d 7 | 0.950 | 33.883 | 52.468 |
| d 14 | 54.665 | 21.732 | 3.147 |
| d 15 | 14.400 | 4.803 | 3.900 |
| d 22 | 4.895 | 8.714 | 8.546 |
| d 25 | 1.921 | 7.699 | 8.770 |

In the zoom lens 4, both surfaces (eighth and ninth surfaces) of the fifth lens L5 of the second lens group G2, an object side surface (twelfth surface) of the seventh lens L7 of the second lens group G2, both surfaces (sixteenth and seventeenth surfaces) of the ninth lens L9 of the third lens group G3, an object side surface (twentieth surface) of the eleventh lens L11 of the third lens group G3, and an object side surface (twenty-third surface) of the thirteenth lens L13 of the fourth lens group G4 are formed as aspheric surfaces. Table 12 shows the 4th-order, 6th-order, 8th-order, and 10th-order aspheric surface coefficients A, B, C, and D of the aspheric surfaces, together with the conic constant κ, in Numerical Example 4.

TABLE 12

| si | κ | A | B | C | D |
|---|---|---|---|---|---|
| 8 | 0.00000E+00 | 2.68992E−05 | −1.78159E−07 | 3.07480E−10 | 0.00000E+00 |
| 9 | 0.00000E+00 | 3.64203E−05 | 1.53703E−07 | 8.80948E−10 | −5.55546E−11 |
| 12 | 0.00000E+00 | 1.58044E−05 | −2.84749E−08 | −1.62768E−09 | 1.04890E−11 |
| 16 | 0.00000E+00 | −2.34188E−05 | 1.72079E−08 | 0.00000E+00 | 0.00000E+00 |
| 17 | 0.00000E+00 | −1.49117E−05 | 1.25473E−07 | 0.00000E+00 | 0.00000E+00 |
| 20 | 0.00000E+00 | −2.88620E−05 | 0.00000E+00 | 0.00000E+00 | 0.00000E+00 |
| 23 | 0.00000E+00 | −2.74631E−06 | −2.65136E−08 | 2.05740E−09 | −2.36304E−11 |

Figure 11:
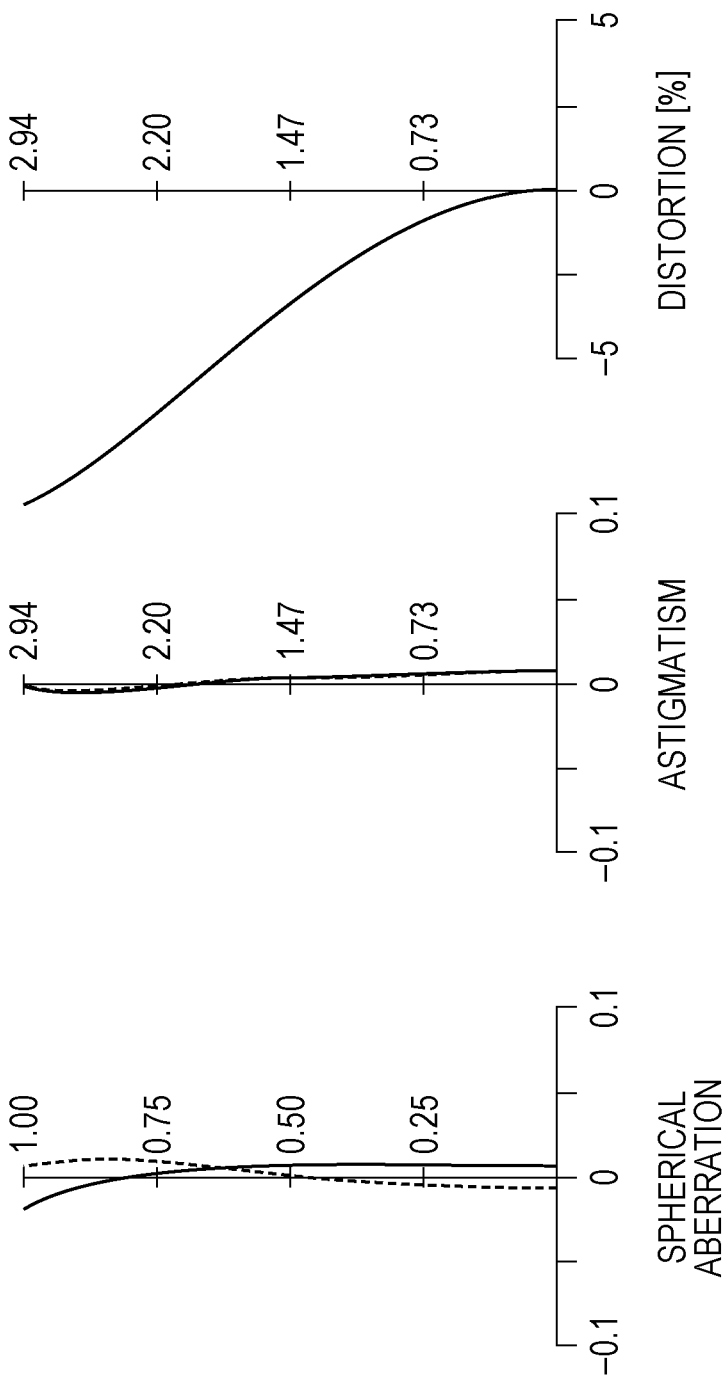
FIG. 11 is a diagram illustrating spherical aberration, astigmatism, and distortion at the wide-angle end in a numerical example in which specific numerical values are applied to the fourth embodiment.

FIG. 11 shows spherical aberration, astigmatism, and distortion at the wide-angle end in Numerical Example 4. FIG. 11 shows spherical aberration, astigmatism, and distortion at the telephoto end in Numerical Example 4.

Figure 12:
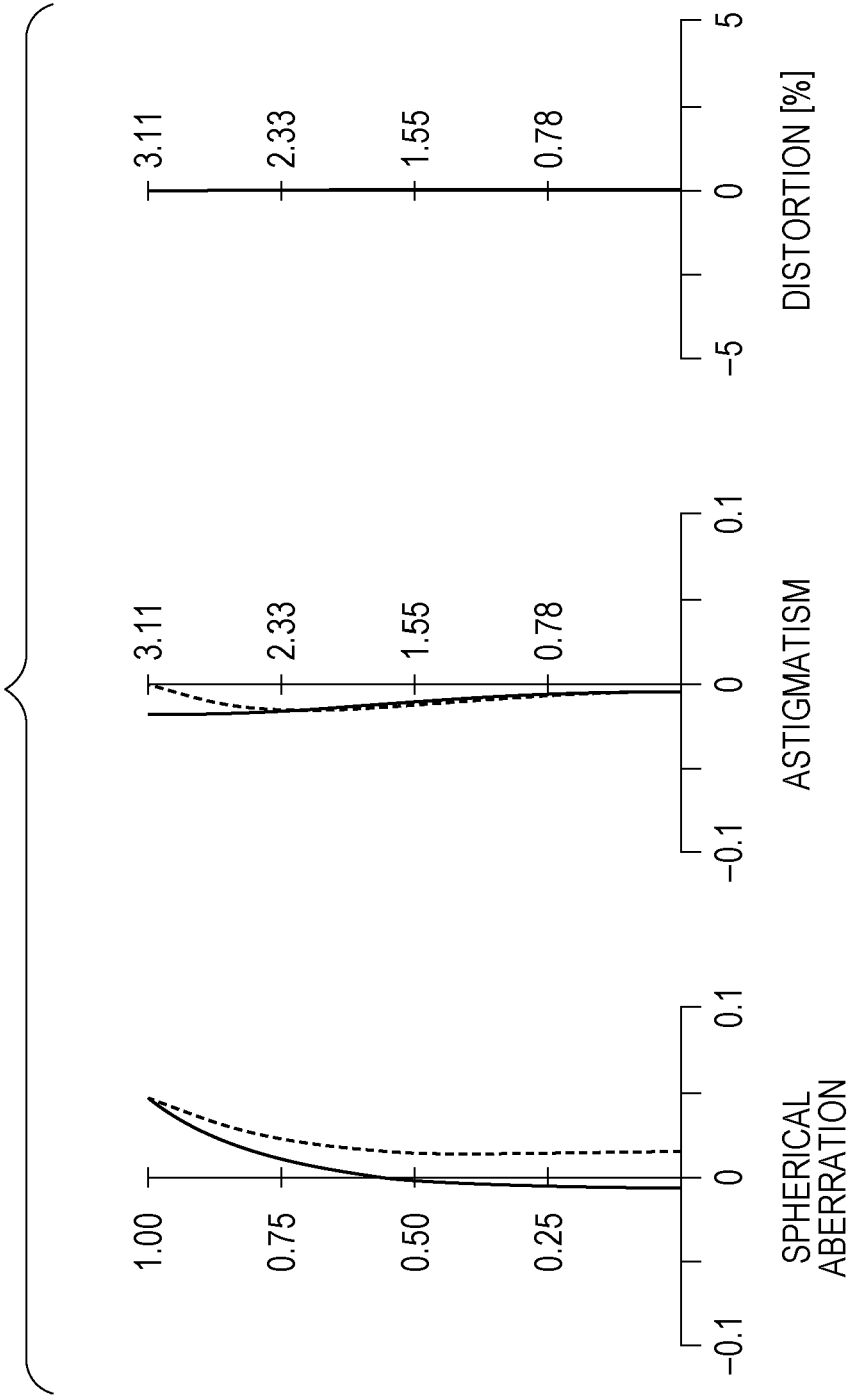
FIG. 12 is a diagram illustrating spherical aberration, astigmatism, and distortion at the telephoto end in the numerical example in which specific numerical values are applied to the fourth embodiment.

In each spherical aberration diagram of FIGS. 11 and 12, the solid line indicates the value of the d-line (the wavelength of 587.56 nm), and the dashed line indicates the value of the g-line (the wavelength of 435.84 nm). In each astigmatism diagram, the solid line indicates the value of the d-line on the sagittal image plane, and the dashed line indicates the value of the d-line on the meridional image plane and indicates the value of the d-line in distortion.

As can be clearly seen from the aberration diagrams, in Numerical Example 4, it is possible to obtain an excellent imaging performance by satisfactorily correcting various aberrations.

Fifth Embodiment

Figure 13:
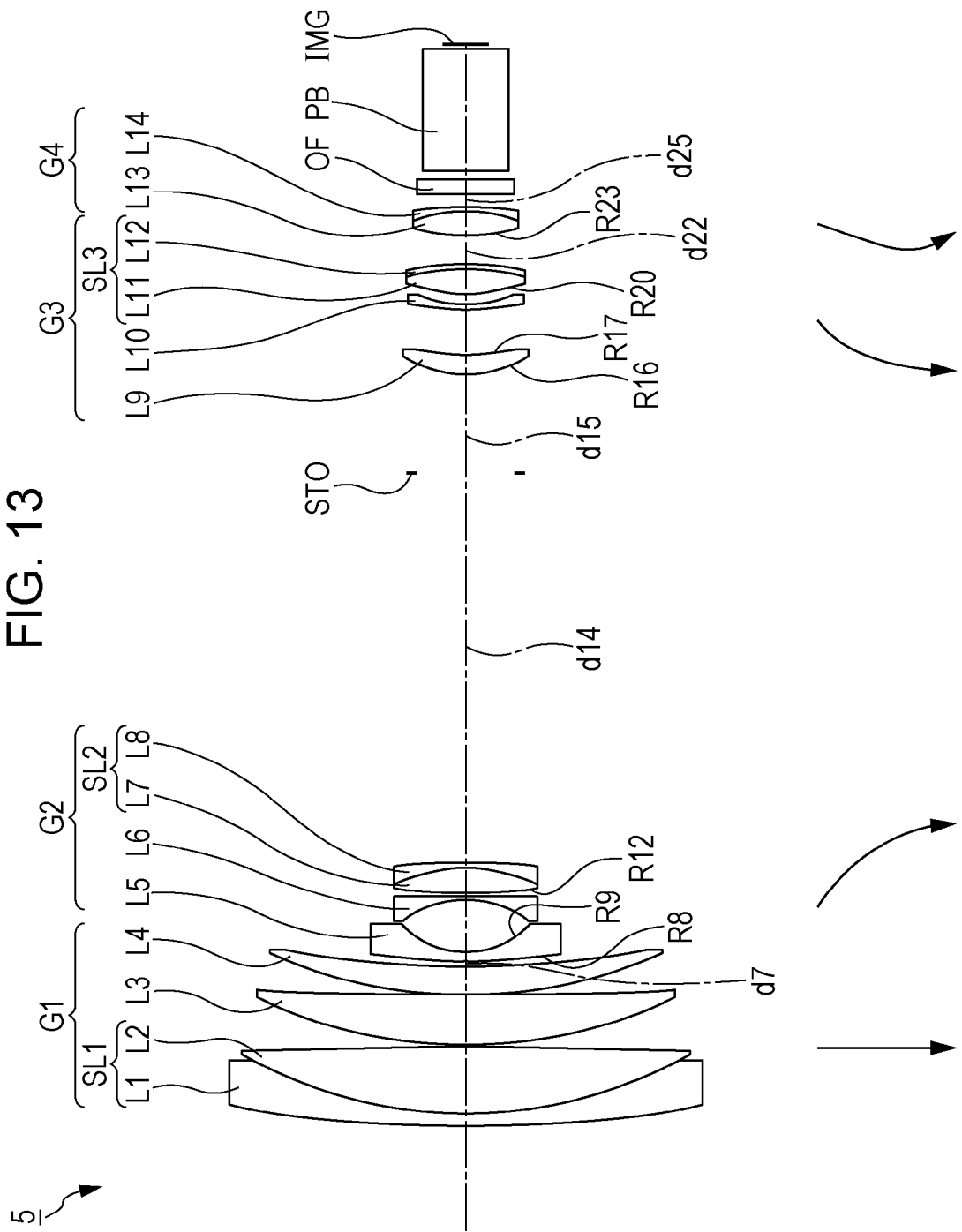
FIG. 13 is a diagram illustrating a lens configuration of a zoom lens according to a fifth embodiment.

FIG. 13 shows a lens configuration of a zoom lens 5 according to a fifth embodiment of the present technology.

The zoom lens 5 has a zoom ratio of 24.0 times.

The zoom lens 5 has fourteen lenses, and includes, in order from the object side to the image side: a first lens group G1 that has a positive refractive power; a second lens group G2 that has a negative refractive power; a third lens group G3 that has a positive refractive power; and a fourth lens group G4 that has a positive refractive power.

In the zoom lens 5, during zooming from a wide-angle end to a telephoto end, the first lens group G1 is stationary relative to an imaging surface IMG, and the second lens group G2 is moved to the image side in the optical axis direction so as to decrease a space between the second lens group G2 and the third lens group G3.

In the zoom lens 5, the fourth lens group G4 is formed as a focus lens group that adjusts focus from infinity to the close range by moving the lens group in the optical axis direction during focusing.

The first lens group G1 includes, in order from the object side to the image side: a cemented lens SL1 that is formed by cementing a first lens L1, which has a meniscus shape convex toward the object side and has a negative refractive power, and a second lens L2 which is positioned to be close to the image side of the first lens L1, has a biconvex shape, and has a positive refractive power; a third lens L3 that has a meniscus shape convex toward the object side and has a positive refractive power; and a fourth lens L4 that has a meniscus shape convex toward the object side and has a positive refractive power. The cemented lens SL1 has a negative refractive power as a whole.

The second lens group G2 includes, in order from the object side to the image side: a fifth lens L5 that has a meniscus shape concave toward the image side and has a negative refractive power; a sixth lens L6 that has a meniscus shape concave toward the object side and has a negative refractive power; and a cemented lens SL2 that is formed by cementing a seventh lens L7, which has a biconvex shape and has a positive refractive power, and an eighth lens L8 which is positioned on the image side of the seventh lens L7, has a meniscus shape concave toward the object side, and has a negative refractive power. The cemented lens SL2 has a positive refractive power as a whole.

The third lens group G3 includes, in order from the object side to the image side: a ninth lens L9 that has a meniscus shape convex toward the object side and has a positive refractive power; a tenth lens L10 that has a meniscus shape convex toward the object side and has a negative refractive power; and a cemented lens SL3 that is formed by cementing an eleventh lens L11, which has a biconvex shape and has a positive refractive power, and a twelfth lens L12 which is positioned on the image side of the eleventh lens L11, has a meniscus shape concave toward the object side, and has a negative refractive power. The cemented lens SL3 has a positive refractive power as a whole.

The fourth lens group G4 includes a cemented lens SL4 that is formed by cementing a thirteenth lens L13, which has a biconvex shape and has a positive refractive power, and a fourteenth lens L14 which is positioned on the image side of the thirteenth lens L13, has a meniscus shape concave toward the object side, and has a negative refractive power. The cemented lens SL4 has a positive refractive power as a whole.

An optical filter OF, a prism block PB, and the imaging surface IMG are arranged on the image side of the fourth lens group G4 in order from the object side to the image side. The prism block PB has a function of separating colors of the optical image.

An aperture stop STO is disposed between the second lens group G2 and the third lens group G3. The aperture stop STO is stationary relative to the imaging surface IMG during zooming.

The cemented lens SL3 of the third lens group G3 is formed as a blur correction group (blur correction lens), and is moved in the direction orthogonal to the optical axis direction at the time of blur correction.

Table 13 shows the lens data of Numerical Example 5 of the zoom lens 5, to which specific numerical values are applied, according to the fifth embodiment.

TABLE 13

| si | Ri | di | Ndi | vdi |
|---|---|---|---|---|
| 1 | 205.974 | 1.600 | 1.90366 | 31.320 |
| 2 | 62.082 | 9.514 | 1.49700 | 81.608 |
| 3 | −753.562 | 0.150 | | |
| 4 | 64.365 | 7.151 | 1.59282 | 68.630 |
| 5 | 728.586 | 0.150 | | |
| 6 | 68.285 | 3.863 | 1.80420 | 46.503 |
| 7 | 142.916 | (d7) | | |
| 8 (ASP) | 150.000 | 1.200 | 1.88202 | 37.220 |
| 9 (ASP) | 12.454 | 7.384 | | |
| 10 | −16.840 | 0.600 | 1.88100 | 40.140 |
| 11 | −1526.825 | 0.500 | | |
| 12 (ASP) | 81.09 | 3.695 | 1.92286 | 20.880 |
| 13 | −20.423 | 0.600 | 1.77250 | 49.624 |
| 14 | −87.816 | (d14) | | |
| STO | INFINITY | (d15) | | |
| 16 (ASP) | 14.630 | 2.747 | 1.68893 | 31.161 |
| 17 (ASP) | 31.156 | 6.220 | | |
| 18 | 34.396 | 0.500 | 1.92119 | 23.960 |

TABLE 13-continued

| si | Ri | di | Ndi | vdi |
|---|---|---|---|---|
| 19 | 15.679 | 1.500 | | |
| 20 (ASP) | 19.209 | 3.983 | 1.49710 | 81.560 |
| 21 | −22.605 | 0.500 | 1.71736 | 29.500 |
| 22 | −35.497 | (d22) | | |
| 23 (ASP) | 22.049 | 3.751 | 1.49710 | 81.560 |
| 24 | −19.111 | 0.500 | 1.58144 | 40.890 |
| 25 | −57.146 | (d25) | | |
| 26 | INFINITY | 2.345 | 1.51680 | 64.200 |
| 27 | INFINITY | 1.000 | | |
| 28 | INFINITY | 17.200 | 1.51680 | 64.200 |
| 29 | INFINITY | 0.530 | | |
| IMG | INFINITY | | | |

Table 14 shows the focal length f of the whole optical system, the F number Fno, the half angle of view ω, and the diameter STOϕ of the aperture stop STO, together with the variable spacings dn, in Numerical Example 5.

TABLE 14

| | Wide-angle end | Middle focal length | Telephoto end |
|---|---|---|---|
| f | 3.897 | 19.091 | 93.597 |
| Fno | 1.631 | 2.819 | 3.533 |
| ω | 39.79 | 9.20 | 1.91 |
| STO ϕ | 13.00 | 9.54 | 7.60 |

TABLE 14-continued

| | Wide-angle end | Middle focal length | Telephoto end |
|---|---|---|---|
| d 7 | 0.900 | 33.753 | 52.914 |
| d 14 | 55.014 | 22.161 | 3.000 |
| d 15 | 14.003 | 3.501 | 3.500 |
| d 22 | 3.845 | 8.819 | 8.438 |
| d 25 | 1.736 | 7.263 | 7.645 |

In the zoom lens 5, both surfaces (eighth and ninth surfaces) of the fifth lens L5 of the second lens group G2, an object side surface (twelfth surface) of the seventh lens L7 of the second lens group G2, both surfaces (sixteenth and seventeenth surfaces) of the ninth lens L9 of the third lens group G3, an object side surface (twentieth surface) of the eleventh lens L11 of the third lens group G3, and an object side surface (twenty-third surface) of the thirteenth lens L13 of the fourth lens group G4 are formed as aspheric surfaces.

Table 15 shows the 4th-order, 6th-order, 8th-order, and 10th-order aspheric surface coefficients A, B, C, and D of the aspheric surfaces, together with the conic constant κ, in Numerical Example 5.

TABLE 15

| si | κ | A | B | C | D |
|---|---|---|---|---|---|
| 8 | 0.00000E+00 | 7.71572E−06 | 8.73036E−08 | −7.87975E−10 | 2.10810E−12 |
| 9 | 0.00000E+00 | 1.50175E−06 | 2.96872E−08 | −8.68167E−11 | −2.72825E−12 |
| 12 | 0.00000E+00 | 4.90915E−06 | −3.93344E−07 | 4.38909E−09 | −2.06132E−11 |
| 16 | 0.00000E+00 | −3.53108E−05 | 5.39872E−07 | −9.18933E−09 | 2.65872E−11 |
| 17 | 0.00000E+00 | −2.66568E−05 | 8.10340E−07 | −1.36840E−08 | 5.59271E−11 |
| 20 | 0.00000E+00 | −3.40332E−05 | 8.72643E−08 | −1.62873E−09 | 3.81260E−12 |
| 23 | 0.00000E+00 | −4.21907E−06 | 1.93764E−07 | −4.33975E−09 | 3.50556E−11 |

FIG. 14 shows spherical aberration, astigmatism, and distortion at the wide-angle end in Numerical Example 5. FIG. 15 shows spherical aberration, astigmatism, and distortion at the telephoto end in Numerical Example 5.

In each spherical aberration diagram of FIGS. 14 and 15, the solid line indicates the value of the d-line (the wavelength of 587.56 nm), and the dashed line indicates the value of the g-line (the wavelength of 435.84 nm). In each astigmatism diagram, the solid line indicates the value of the d-line on the sagittal image plane, and the dashed line indicates the value of the d-line on the meridional image plane and indicates the value of the d-line in distortion.

As can be clearly seen from the aberration diagrams, in Numerical Example 5, it is possible to obtain an excellent imaging performance by satisfactorily correcting various aberrations.

Respective Values of Conditional Expressions of Zoom Lenses

Hereinafter, respective values of conditional expressions of the zoom lenses according to the present technology will be described.

Table 16 shows the respective values of Conditional Expressions (1) to (12) in Numerical Examples 1 to 5 of the zoom lenses 1 to 5.

TABLE 16

|  | Example 1 | Example 2 | Example 3 | Example 4 | Example 5 |
|---|---|---|---|---|---|
| (1) $-0.95 < fg3\_neg/fg3 < -0.5$ | −0.667 | −0.678 | −0.766 | −0.918 | −0.922 |
| fg3_neg | −24.275 | −24.557 | −27.671 | −32.456 | −31.377 |
| fg3 | 36.40 | 36.23 | 36.12 | 35.37 | 34.04 |
| (2) $1.85 < Ndg3\_neg < 1.95$ | 1.92119 | 1.92119 | 1.92119 | 1.92119 | 1.92119 |
| (3) $20.0 < \upsilon dg3\_neg < 30.0$ | 23.960 | 23.960 | 23.960 | 23.960 | 23.960 |
| (4) $7.0 < fg3/fw < 11.0$ | 9.134 | 9.091 | 9.063 | 8.875 | 8.734 |
| fw | 3.985 | 3.985 | 3.985 | 3.985 | 3.897 |
| (5) $0.10 < \{\beta g3(t)/\beta g3(w)\}/\{ft/fw\} < 0.22$ | 0.182 | 0.177 | 0.169 | 0.166 | 0.133 |
| $\beta g3(t)$ | −2.693 | −2.582 | −2.400 | −2.307 | −1.801 |
| $\beta g3(w)$ | −0.649 | −0.639 | −0.623 | −0.609 | −0.563 |
| ft | 90.859 | 90.863 | 90.860 | 90.862 | 93.597 |
| (6) $0.65 < fsl3/fg3 < 1.05$ | 0.835 | 0.841 | 0.852 | 0.863 | 0.826 |
| fsl3 | 30.40 | 30.46 | 30.79 | 30.51 | 28.11 |
| (7) $-0.90 < Rsl3/fg3 < -0.50$ | −0.671 | −0.687 | −0.735 | −0.733 | −0.664 |
| Rsl3 | −24.420 | −24.900 | −26.538 | −25.921 | −22.605 |
| (8) $-3.5 < fg2/fw < -2.0$ | −2.648 | −2.653 | −2.677 | −2.682 | −2.758 |
| fg2 | −10.55 | −10.57 | −10.67 | −10.69 | −10.75 |
| (9) $-4.5 < fsl2/fg2 < -2.7$ | −3.774 | −3.641 | −3.519 | −3.777 | −3.368 |
| fsl2 | 39.82 | 38.50 | 37.54 | 40.37 | 36.21 |
| (10) $1.5 < Rsl2/fg2 < 2.7$ | 2.260 | 2.270 | 2.238 | 2.153 | 1.900 |
| Rsl2 | −23.851 | −24.000 | −23.873 | −23.011 | −20.423 |
| (11) $15 < fg1/fw < 23$ | 18.741 | 18.760 | 18.891 | 18.932 | 19.343 |
| fg1 | 74.69 | 74.77 | 75.29 | 75.45 | 75.38 |
| (12) $-10.5 < fsl1/fg1 < -5.0$ | −6.258 | −6.290 | −7.240 | −8.267 | −8.706 |
| fsl1 | −467.40 | −470.27 | −545.09 | −623.78 | −656.29 |

As can be seen from Table 16, the zoom lenses 1 to 5 are configured to satisfy Conditional Expressions (1) to (12).

Configuration of Imaging Apparatus

In an imaging apparatus according to the present technology, a zoom lens includes, in order from the object side to the image side: a first lens group that has a positive refractive power; a second lens group that has a negative refractive power; a third lens group that has a positive refractive power; and a fourth lens group that has a positive refractive power. Further, in the zoom lens of the imaging apparatus according to the present technology, during zooming from a wide-angle end to a telephoto end, the first lens group is stationary relative to an imaging surface, and the second lens group is moved to the image side in an optical axis direction so as to decrease a space between the second lens group and the third lens group. Furthermore, in the zoom lens of the imaging apparatus according to the present technology, the third lens group includes, in order from the object side to the image side, a positive lens, a negative lens, and a cemented lens which has a positive refractive power and is formed of a positive lens positioned on the object side and a negative lens positioned on the image side.

By forming the zoom lens in such a manner, even when the zoom ratio of the optical system is set to be high, it is possible to reduce the total length of the optical system. Besides, it is possible to appropriately correct spherical aberration, comatic aberration, and chromatic aberration of the third lens group. Hence, it becomes easy to achieve an increase in the image quality.

In the imaging apparatus according to the present technology, the zoom lens satisfies the following Conditional Expression (1).

$$-0.95 < fg3\_neg/fg3 < -0.5, \quad (1)$$

where fg3_neg is a focal length of the negative lens which is a second element from the object side in the third lens group, and fg3 is a focal length of the third lens group.

Conditional Expression (1) relates to a focal length of the negative lens which is the second element from the object side in the third lens group.

When the result of Conditional Expression (1) is less than the lower limit thereof, the refractive power of the negative lens excessively decreases, and thus the magnification ratio of the negative lens decreases. Accordingly, particularly, when the optical design is made such that the focal length decreases in order to achieve an increase in the angle of view of the optical system, it is difficult to sufficiently secure a back focal length of the optical system. As a result, it is difficult for the optical design to be applied to an imaging apparatus for which a long back focal length is necessary like a camera using a color separation prism or an interchangeable lens camera.

In contrast, when the result of Conditional Expression (1) is greater than the upper limit thereof, the refractive power of the negative lens excessively increases, and thus occurrence of spherical aberration, comatic aberration, and astigmatism of the third lens group excessively increases. As a result, the image quality is deteriorated.

Accordingly, by making the zoom lens satisfy Conditional Expression (1), the refractive power of the negative lens is appropriately set, the back focal length of the optical system can be sufficiently secured, and occurrence of spherical aberration, comatic aberration, and astigmatism of the third lens group decreases. As a result, it is possible to improve the image quality.

In addition, in order to obtain better optical performance, it is preferable that the zoom lens satisfy the following Conditional Expression (1)'.

$$-0.95 < fg3\_neg/fg3 < -0.6 \quad (1)'$$

By making the zoom lens satisfy Conditional Expression (1)', the effect of Conditional Expression (1) is further enhanced, the back focal length of the optical system can be sufficiently secured, and occurrence of spherical aberration, comatic aberration and astigmatism of the third lens group further decreases. As a result, it is possible to further improve the image quality.

In the imaging apparatus according to an embodiment of the present technology, it is preferable that a prism block, which separates colors of the optical image, be disposed between the zoom lens and the imaging device.

Since the prism block, which separates colors of the optical image, is disposed between the zoom lens and the imaging device, the colors of the optical image, which is incident onto the prism block, are separated. Due to excellent color reproduction ability using the prism block, it is possible to improve the image quality.

Configuration of Different Imaging Apparatus

In a different imaging apparatus according to the present technology, a zoom lens includes, in order from the object side to the image side: a first lens group that has a positive refractive power; a second lens group that has a negative refractive power; a third lens group that has a positive refractive power; and a fourth lens group that has a positive refractive power. Further, in the zoom lens of the different imaging apparatus according to the present technology, during zooming from a wide-angle end to a telephoto end, the first lens group is stationary relative to an imaging surface, and the second lens group is moved to the image side in an optical axis direction so as to decrease a space between the second lens group and the third lens group. Furthermore, in the zoom lens of the different imaging apparatus according to the present technology, the third lens group includes, in order from the object side to the image side, a positive lens, a negative lens, and a cemented lens which has a positive refractive power and is formed of a positive lens positioned on the object side and a negative lens positioned on the image side.

By forming the zoom lens in such a manner, even when the zoom ratio of the optical system is set to be high, it is possible to reduce the total length of the optical system. Besides, it is possible to appropriately correct spherical aberration, comatic aberration, and chromatic aberration of the third lens group. Hence, it becomes easy to achieve an increase in the image quality.

In the different imaging apparatus according to the present technology, the zoom lens satisfies the following Conditional Expressions (2) and (3).

$$1.85 < Ndg3\_neg < 1.95, \text{ and} \qquad (2)$$

$$20.0 < vdg3\_neg < 30.0, \qquad (3)$$

where $Ndg3\_neg$ is a refractive index of glass of the negative lens, which is the second element from the object side in the third lens group, at the d-line, and $vdg3\_neg$ is an Abbe number of the glass of the negative lens, which is the second element from the object side in the third lens group, at the d-line.

Conditional Expression (2) defines the refractive index of glass of the negative lens, which is the second element from the object side in the third lens group, at the d-line.

When the result of Conditional Expression (2) is greater than the upper limit thereof, curvature of a concave lens surface of the negative lens is excessively gentle. Hence, the Petzval curvature is large and negative, and excessively large curvature of field remains on the underside. As a result, the image quality is deteriorated.

In contrast, when the result of Conditional Expression (2) is less than the lower limit thereof, the curvature of the concave lens surface of the negative lens is excessively steep. Hence, the Petzval curvature is greatly biased to the positive side, and excessively large curvature of field occurs on the over side. Alternatively, since the curvature is excessively steep, occurrence of spherical aberration, comatic aberration, and astigmatism of the third lens group excessively increases. As a result, the image quality is deteriorated.

Accordingly, by making the zoom lens satisfy Conditional Expression (2), the radius of curvature of the concave lens surface of the negative lens is appropriately set, and a favorable correction function is secured. Thereby, it is possible to improve the image quality.

In addition, in order to obtain better optical performance, it is preferable that the zoom lens satisfy the following Conditional Expression (2)'.

$$1.875 < Ndg3\_neg < 1.94 \qquad (2)'$$

By making the zoom lens satisfy Conditional Expression (2)', the effect of Conditional Expression (2) is further enhanced, and a better correction function is secured. Thereby, it is possible to further improve the image quality.

In addition, in order to obtain further better optical performance, it is preferable that the zoom lens satisfy the following Conditional Expression (2)".

$$1.90 < Ndg3\_neg < 1.93 \qquad (2)''$$

By making the zoom lens satisfy Conditional Expression (2)", the effect of Conditional Expression (2) is still further enhanced, and a further better correction function is secured. Thereby, it is possible to still further improve the image quality.

Conditional Expression (3) defines the Abbe number of the glass of the negative lens, which is the second element from the object side in the third lens group, at the d-line.

When the result of Conditional Expression (3) is greater than the upper limit thereof, the color separation effect of the negative lens excessively decreases. Hence, it is difficult to sufficiently correct chromatic aberration of the third lens group having a positive refractive power. As a result, the image quality is deteriorated.

In contrast, when the result of Conditional Expression (3) is less than the lower limit thereof, the color separation effect of the negative lens excessively increases. Hence, chromatic aberration of the third lens group is excessively corrected. As a result, the image quality is deteriorated.

Accordingly, by making the zoom lens satisfy Conditional Expression (3), the color separation effect of the negative lens is appropriately adjusted, and chromatic aberration of the third lens group is satisfactorily corrected. As a result, it is possible to improve the image quality.

In addition, in order to obtain better optical performance, it is preferable that the zoom lens satisfy the following Conditional Expression (3)'.

$$21.0 < vdg3\_neg < 27.0 \qquad (3)'$$

By making the zoom lens satisfy Conditional Expression (3)', the effect of Conditional Expression (3) is further enhanced, chromatic aberration of the third lens group is further satisfactorily corrected, and it is possible to further improve the image quality.

In addition, in order to obtain further better optical performance, it is preferable that the zoom lens satisfy the following Conditional Expression (3)".

$$22.0 < vdg3\_neg < 25.0 \qquad (3)''$$

By making the zoom lens satisfy Conditional Expression (3)", the effect of Conditional Expression (3) is still further enhanced, chromatic aberration of the third lens group is still further satisfactorily corrected, and it is possible to still further improve the image quality.

Embodiment of Imaging Apparatus

FIG. 16 shows a block diagram of a digital still camera as the imaging apparatus according to an embodiment of the present technology.

The imaging apparatus (digital still camera) 100 includes: a camera block 10 that has a function of capturing an image; a camera signal processing section 20 that performs a signal processing such as an analog-to-digital conversion processing on a captured-image signal; and an image processing section 30 that performs a process of recording and reproducing the image signal. Further, the imaging apparatus 100 includes: a display section such as a liquid crystal display (LCD) 40 that displays the photographed image and the like; a reader/writer (R/W) 50 that writes and reads image signals in the memory card (recording media) 1000; a central processing unit (CPU) 60 that controls the entire imaging apparatus 100; an input section 70, such as various switches, that is used for a user's operation input; and a lens driving control section 80 that controls driving of the lens within the camera block 10.

The camera block 10 includes: an optical system including the zoom lens 11 (one of the zoom lenses 1 to 5 according to the embodiment of the present technology); and an imaging device 12 such as a charge coupled device (CCD), a complementary metal oxide semiconductor (CMOS), or the like.

The camera signal processing section 20 is configured to perform various signal processes, such as a process of conversion into a digital signal, noise removal, image quality correction, and a process of conversion into luminance and chromatic difference signals, on the output signal which is output from the imaging device 12.

The image processing section 30 is configured to perform a process of encoding for compression and decoding for decompression on an image signal based on a predetermined image data format, a process of conversion of data specification such as resolution, and the like.

The display section 40 has a function to display various data such as a condition of the operation performed by a user with the aid of the input section 70 and a photographed image.

The R/W 50 is configured to write image data, which is encoded by the image processing section 30, into the memory card 1000 and additionally to read the image data which is recorded on the memory card 1000.

The CPU 60 functions as a control processing section to control all the circuit blocks within the imaging apparatus 100, and controls the circuit blocks on the basis of the instruction input signals and the like from the input section 70.

The input section 70 includes, for example, a shutter release button for performing a shutter operation, a selection switch for selecting operation modes, and the like. The input section 70 is configured to output the instruction input signal in response to the user's operation to the CPU 60.

The lens driving control section 80 is configured to control a motor, which is not shown in the drawing, for driving the lenses within the zoom lens 11 on the basis of the control signal from the CPU 60.

The memory card 1000 is, for example, a semiconductor memory which is removable from a slot connected to the R/W 50.

Next, operations of the imaging apparatus 100 will be described.

When the photographing is standby, an image signal captured by the camera block 10 under the control of the CPU 60 is output to the display section 40 through the camera signal processing section 20 so as to be displayed as a camera live view image. Further, when the instruction input signal for zooming is input from the input section 70, the CPU 60 outputs a control signal to the lens driving control section 80, and moves predetermined lenses within the zoom lens 11 on the basis of the control of the lens driving control section 80.

When the not-shown shutter of the camera block 10 is operated by the instruction input signal from the input section 70, the captured image signal is output from the camera signal processing section 20 to the image processing section 30, is encoded for compression, and is converted into digital data of the predetermined data format. The converted data is output to the R/W 50 and is written in the memory card 1000.

For focusing, the lens driving control section 80 moves the predetermined lenses of the zoom lens 11 on the basis of the control signal received from the CPU 60, for example, when the shutter release button of the input section 70 is pressed halfway or pressed fully for recording (photography).

For reproduction of image data recorded in the memory card 1000, the R/W 50 reads out the prescribed image data from the memory card 1000 in response to the operation performed on the input section 70. The readout image data is decoded for decompression by the image processing section 30 and the reproduced image signal is then output to the display section 40, thereby displaying the reproduced image.

Other

In the zoom lens and the imaging apparatus according to the present technology, in addition to the first to fourth lens groups G1 to G4, another optical element such as a lens having no refractive power may be disposed. In this case, the lens configuration of the zoom lens according to the present technology is actually a configuration using four lens groups of the first to fourth lens groups G1 to G4.

Further, according to the present technology, the imaging angle of view of the lens is sufficiently wide, the magnification thereof is high, the size thereof is compact, the speed thereof is sufficiently high throughout the entire zoom range, and the optical performance thereof is high. Accordingly, it is possible to secure a sufficiently long back focal length adaptable to an interchangeable lens camera or a camera which employs a color separation prism.

It should be noted that the effects described in the present specification are just examples and are not limited to this. Further, the present technology may have other effects.

Present Technology

The present technology is able to adopt the following configurations.

<1>

A zoom lens including, in order from an object side to an image side:

a first lens group that has a positive refractive power;

a second lens group that has a negative refractive power;

a third lens group that has a positive refractive power; and a fourth lens group that has a positive refractive power, in which during zooming from a wide-angle end to a telephoto end, the first lens group is stationary relative to an imaging surface, and the second lens group is moved to the image side in an optical axis direction so as to decrease a space between the second lens group and the third lens group, in which the third lens group includes, in order from the object side to the image side, a positive lens, a negative lens, and a cemented lens which has a positive refractive power and is formed of a positive lens positioned on the object side and a negative lens positioned on the image side, and in which the following Conditional Expression (1) is satisfied.

$$-0.95 < fg3\_neg/fg3 < -0.5, \quad (1)$$

where fg3_neg is a focal length of the negative lens which is a second element from the object side in the third lens group, and fg3 is a focal length of the third lens group.

<2>

A zoom lens including, in order from an object side to an image side:

a first lens group that has a positive refractive power;
a second lens group that has a negative refractive power;
a third lens group that has a positive refractive power; and
a fourth lens group that has a positive refractive power, in which during zooming from a wide-angle end to a telephoto end, the first lens group is stationary relative to an imaging surface, and the second lens group is moved to the image side in an optical axis direction so as to decrease a space between the second lens group and the third lens group, in which the third lens group includes, in order from the object side to the image side, a positive lens, a negative lens, and a cemented lens which has a positive refractive power and is formed of a positive lens positioned on the object side and a negative lens positioned on the image side, and in which the following Conditional Expressions (2) and (3) are satisfied.

$$1.85 < Ndg3\_neg < 1.95, \text{ and} \quad (2)$$

$$20.0 < vdg3\_neg < 30.0, \quad (3)$$

where

Ndg3_neg is a refractive index of glass of the negative lens, which is the second element from the object side in the third lens group, at the d-line, and vdg3_neg is an Abbe number of the glass of the negative lens, which is the second element from the object side in the third lens group, at the d-line.

<3>

The zoom lens according to <1> or <2>, in which during zooming from the wide-angle end to the telephoto end, the third lens group is moved in the optical axis direction so as to decrease the space between the second lens group and the third lens group.

<4>

The zoom lens according to any one of <1> to <3>, in which during zooming from the wide-angle end to the telephoto end, the third lens group is moved only unidirectionally toward the object side in the optical axis direction.

<5>

The zoom lens according to any one of <1> to <4>, in which the following Conditional Expression (4) is satisfied.

$$7.0 < fg3/fw < 11.0, \quad (4)$$

where fw is a focal length of a whole optical system at the wide-angle end when focus is at infinity.

<6>

The zoom lens according to any one of <1> to <5>, in which the following Conditional Expression (5) is satisfied.

$$0.10 < \{\beta g3(t)/\beta g3(w)\}/\{ft/fw\} < 0.22, \quad (5)$$

where

βg3(w) is a lateral magnification of the third lens group at the wide-angle end when focus is at infinity, βg3(t) is a lateral magnification of the third lens group at the telephoto end when focus is at infinity, fw is a focal length of a whole optical system at the wide-angle end when focus is at infinity, and ft is a focal length of the whole optical system at the telephoto end when focus is at infinity.

<7>

The zoom lens according to any one of <1> to <6>, in which the following Conditional Expression (6) is satisfied.

$$0.65 < fsl3/fg3 < 1.05, \quad (6)$$

where fsl3 is a focal length of the cemented lens of the third lens group.

<8>

The zoom lens according to any one of <1> to <7>, in which the following Conditional Expression (7) is satisfied.

$$-0.90 < Rsl3/fg3 < -0.50, \quad (7)$$

where

Rsl3 is a radius of curvature of a cemented surface of the cemented lens of the third lens group.

<9>

The zoom lens according to any one of <1> to <8>, in which the second lens group includes, in order from the object side to the image side, a negative lens, a negative lens, and a cemented lens which has a positive refractive power and is formed of a positive lens positioned on the object side and a negative lens positioned on the image side.

<10>

The zoom lens according to any one of <1> to <9>, in which the following Conditional Expression (8) is satisfied.

$$-3.5 < fg2/fw < -2.0, \quad (8)$$

where fg2 is a focal length of the second lens group, and fw is a focal length of a whole optical system at the wide-angle end when focus is at infinity.

<11>

The zoom lens according to any one of <1> to <10>, in which the following Conditional Expression (9) is satisfied.

$$-4.5 < fsl2/fg2 < -2.7, \quad (9)$$

where fsl2 is a focal length of a cemented lens of the second lens group, and fg2 is a focal length of the second lens group.

<12>

The zoom lens according to any one of <1> to <11>, in which the following Conditional Expression (10) is satisfied.

$$1.5 < Rsl2/fg2 < 2.7, \quad (10)$$

where

Rsl2 is a radius of curvature of a cemented surface of a cemented lens of the second lens group, and fg2 is a focal length of the second lens group.

<13>

The zoom lens according to any one of <1> to <12>, in which the first lens group includes, in order from the object side to the image side, a cemented lens which has a negative refractive power and is formed of a negative lens positioned on the object side and a positive lens positioned on the image side, a positive lens, and a positive lens.

<14>

The zoom lens according to any one of <1> to <13>, in which the following Conditional Expression (11) is satisfied.

$$15 < fg1/fw < 23, \quad (11)$$

where fg1 is a focal length of the first lens group, and fw is a focal length of a whole optical system at the wide-angle end when focus is at infinity.

<15>

The zoom lens according to any one of <1> to <14>, in which the following Conditional Expression (12) is satisfied.

$$-10.5 < fsl1/fg1 < -5.0, \quad (12)$$

where fsl1 is a focal length of a cemented lens of the first lens group, and fg1 is a focal length of the first lens group.

<16>

The zoom lens according to any one of <1> to <15>, in which during zooming from the wide-angle end to the telephoto end, the fourth lens group is moved in the optical axis direction, and in which during focusing, the zoom lens is in focus by moving the fourth lens group in the optical axis direction.

<17>

The zoom lens according to any one of <1> to <16>, in which the third lens group has a function of correcting image blur by shifting the cemented lens in a direction orthogonal to the optical axis direction.

<18>

The zoom lens according to any one of <1> to <17>, in which an aperture stop, which determines an F number, is disposed between the second lens group and the third lens group, and in which during zooming, the aperture stop is stationary relative to the imaging surface.

<19>

An imaging apparatus including:

a zoom lens; and an imaging device that converts an optical image, which is formed by the zoom lens, into an electrical signal, in which the zoom lens includes, in order from an object side to an image side a first lens group that has a positive refractive power, a second lens group that has a negative refractive power, a third lens group that has a positive refractive power, and a fourth lens group that has a positive refractive power, in which during zooming from a wide-angle end to a telephoto end, the first lens group is stationary relative to an imaging surface, and the second lens group is moved to the image side in an optical axis direction so as to decrease a space between the second lens group and the third lens group, in which the third lens group includes, in order from the object side to the image side, a positive lens, a negative lens, and a cemented lens which has a positive refractive power and is formed of a positive lens positioned on the object side and a negative lens positioned on the image side, and in which the following Conditional Expression (1) is satisfied.

$$-0.95 < fg3\_neg/fg3 < -0.5, \quad (1)$$

where fg3_neg is a focal length of the negative lens which is a second element from the object side in the third lens group, and fg3 is a focal length of the third lens group.

<20>

An imaging apparatus including:

a zoom lens; and an imaging device that converts an optical image, which is formed by the zoom lens, into an electrical signal, in which the zoom lens includes, in order from an object side to an image side a first lens group that has a positive refractive power, a second lens group that has a negative refractive power, a third lens group that has a positive refractive power, and a fourth lens group that has a positive refractive power, in which during zooming from a wide-angle end to a telephoto end, the first lens group is stationary relative to an imaging surface, and the second lens group is moved to the image side in an optical axis direction so as to decrease a space between the second lens group and the third lens group, in which the third lens group includes, in order from the object side to the image side, a positive lens, a negative lens, and a cemented lens which has a positive refractive power and is formed of a positive lens positioned on the object side and a negative lens positioned on the image side, and in which the following Conditional Expressions (2) and (3) are satisfied.

$$1.85 < Ndg3\_neg < 1.95, \text{ and} \quad (2)$$

$$20.0 < vdg3\_neg < 30.0, \quad (3)$$

where

Ndg3_neg is a refractive index of glass of the negative lens, which is the second element from the object side in the third lens group, at the d-line, and vdg3_neg is an Abbe number of the glass of the negative lens, which is the second element from the object side in the third lens group, at the d-line.

<21>

The zoom lens according to <19> or <20>, in which a prism block, which separates colors of the optical image, is disposed between the zoom lens and the imaging device.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising, in order from an object side to an image side:

a first lens group that has a positive refractive power;

a second lens group that has a negative refractive power;

a third lens group that has a positive refractive power; and a fourth lens group that has a positive refractive power, wherein during zooming from a wide-angle end to a telephoto end, the first lens group is stationary relative to an imaging surface, and the second lens group is moved to the image side in an optical axis direction so as to decrease a space between the second lens group and the third lens group, wherein the third lens group includes, in order from the object side to the image side, a positive lens, a negative lens, and a cemented lens which has a positive refractive power and is formed of a positive lens positioned on the object side and a negative lens positioned on the image side, and wherein the following Conditional Expression (1) is satisfied:

$$-0.95 < fg3\_neg/fg3 < -0.5, \quad (1)$$

where fg3_neg is a focal length of the negative lens which is a second element from the object side in the third lens group, and fg3 is a focal length of the third lens group.

2. A zoom lens comprising, in order from an object side to an image side:

a first lens group that has a positive refractive power;

a second lens group that has a negative refractive power;

a third lens group that has a positive refractive power; and a fourth lens group that has a positive refractive power, wherein during zooming from a wide-angle end to a telephoto end, the first lens group is stationary relative to an imaging surface, and the second lens group is moved to the image side in an optical axis direction so as to decrease a space between the second lens group and the third lens group, wherein the third lens group includes, in order from the object side to the image side, a positive lens, a negative lens, and a cemented lens which has a positive refractive power and is formed of a positive lens positioned on the object side and a negative lens positioned on the image side, and wherein the following Conditional Expressions (2) and (3) are satisfied:

$$1.85 < Ndg3\_neg < 1.95, \text{ and} \tag{2}$$

$$20.0 < vdg3\_neg < 30.0, \tag{3}$$

where

Ndg3_neg is a refractive index of glass of the negative lens, which is the second element from the object side in the third lens group, at the d-line, and vdg3_neg is an Abbe number of the glass of the negative lens, which is the second element from the object side in the third lens group, at the d-line.

3. The zoom lens according to claim 1, wherein during zooming from the wide-angle end to the telephoto end, the third lens group is moved in the optical axis direction so as to decrease the space between the second lens group and the third lens group.

4. The zoom lens according to claim 1, wherein during zooming from the wide-angle end to the telephoto end, the third lens group is moved only unidirectionally toward the object side in the optical axis direction.

5. The zoom lens according to claim 1, wherein the following Conditional Expression (4) is satisfied:

$$7.0 < fg3/fw < 11.0, \tag{4}$$

where fw is a focal length of a whole optical system at the wide-angle end when focus is at infinity.

6. The zoom lens according to claim 1, wherein the following Conditional Expression (5) is satisfied:

$$0.10 < \{\beta g3(t)/\beta g3(w)\}/\{ft/fw\} < 0.22, \tag{5}$$

where

βg3(w) is a lateral magnification of the third lens group at the wide-angle end when focus is at infinity, βg3(t) is a lateral magnification of the third lens group at the telephoto end when focus is at infinity, fw is a focal length of a whole optical system at the wide-angle end when focus is at infinity, and ft is a focal length of the whole optical system at the telephoto end when focus is at infinity.

7. The zoom lens according to claim 1, wherein the following Conditional Expression (6) is satisfied:

$$0.65 < fsl3/fg3 < 1.05, \tag{6}$$

where fsl3 is a focal length of the cemented lens of the third lens group.

8. The zoom lens according to claim 1, wherein the following Conditional Expression (7) is satisfied:

$$-0.90 < Rsl3/fg3 < -0.50, \tag{7}$$

where

Rsl3 is a radius of curvature of a cemented surface of the cemented lens of the third lens group.

9. The zoom lens according to claim 1, wherein the second lens group includes, in order from the object side to the image side, a negative lens, a negative lens, and a cemented lens which has a positive refractive power and is formed of a positive lens positioned on the object side and a negative lens positioned on the image side.

10. The zoom lens according to claim 1, wherein the following Conditional Expression (8) is satisfied:

$$-3.5 < fg2/fw < -2.0, \tag{8}$$

where fg2 is a focal length of the second lens group, and fw is a focal length of a whole optical system at the wide-angle end when focus is at infinity.

11. The zoom lens according to claim 1, wherein the following Conditional Expression (9) is satisfied:

$$-4.5 < fsl2/fg2 < -2.7, \tag{9}$$

where fsl2 is a focal length of a cemented lens of the second lens group, and fg2 is a focal length of the second lens group.

12. The zoom lens according to claim 1, wherein the following Conditional Expression (10) is satisfied:

$$1.5 < Rsl2/fg2 < 2.7, \tag{10}$$

where

Rsl2 is a radius of curvature of a cemented surface of a cemented lens of the second lens group, and fg2 is a focal length of the second lens group.

13. The zoom lens according to claim 1, wherein the first lens group includes, in order from the object side to the image side, a cemented lens which has a negative refractive power and is formed of a negative lens positioned on the object side and a positive lens positioned on the image side, a positive lens, and a positive lens.

14. The zoom lens according to claim 1, wherein the following Conditional Expression (11) is satisfied:

$$15 < fg1/fw < 23, \tag{11}$$

where fg1 is a focal length of the first lens group, and fw is a focal length of a whole optical system at the wide-angle end when focus is at infinity.

15. The zoom lens according to claim 1, wherein the following Conditional Expression (12) is satisfied:

$$-10.5 < fsl1/fg1 < -5.0, \tag{12}$$

where fsl1 is a focal length of a cemented lens of the first lens group, and fg1 is a focal length of the first lens group.

16. The zoom lens according to claim 1,
wherein during zooming from the wide-angle end to the telephoto end, the fourth lens group is moved in the optical axis direction, and
wherein during focusing, the zoom lens is in focus by moving the fourth lens group in the optical axis direction.

17. The zoom lens according to claim 1, wherein the third lens group has a function of correcting image blur by shifting the cemented lens in a direction orthogonal to the optical axis direction.

18. The zoom lens according to claim 1,
wherein an aperture stop, which determines an F number, is disposed between the second lens group and the third lens group, and
wherein during zooming, the aperture stop is stationary relative to the imaging surface.

19. An imaging apparatus comprising:
a zoom lens; and
an imaging device that converts an optical image, which is formed by the zoom lens, into an electrical signal,
wherein the zoom lens includes, in order from an object side to an image side
  a first lens group that has a positive refractive power,
  a second lens group that has a negative refractive power,
  a third lens group that has a positive refractive power, and
  a fourth lens group that has a positive refractive power,
wherein during zooming from a wide-angle end to a telephoto end, the first lens group is stationary relative to an imaging surface, and the second lens group is moved to the image side in an optical axis direction so as to decrease a space between the second lens group and the third lens group,
wherein the third lens group includes, in order from the object side to the image side, a positive lens, a negative lens, and a cemented lens which has a positive refractive power and is formed of a positive lens positioned on the object side and a negative lens positioned on the image side, and
wherein the following Conditional Expression (1) is satisfied:

$$-0.95 < fg3\_neg/fg3 < -0.5, \quad (1)$$

where
$fg3\_neg$ is a focal length of the negative lens which is a second element from the object side in the third lens group, and
$fg3$ is a focal length of the third lens group.

20. An imaging apparatus comprising:
a zoom lens; and
an imaging device that converts an optical image, which is formed by the zoom lens, into an electrical signal,
wherein the zoom lens includes, in order from an object side to an image side
  a first lens group that has a positive refractive power,
  a second lens group that has a negative refractive power,
  a third lens group that has a positive refractive power, and
  a fourth lens group that has a positive refractive power,
wherein during zooming from a wide-angle end to a telephoto end, the first lens group is stationary relative to an imaging surface, and the second lens group is moved to the image side in an optical axis direction so as to decrease a space between the second lens group and the third lens group,
wherein the third lens group includes, in order from the object side to the image side, a positive lens, a negative lens, and a cemented lens which has a positive refractive power and is formed of a positive lens positioned on the object side and a negative lens positioned on the image side, and
wherein the following Conditional Expressions (2) and (3) are satisfied:

$$1.85 < Ndg3\_neg < 1.95, \text{ and} \quad (2)$$

$$20.0 < vdg3\_neg < 30.0, \quad (3)$$

where
$Ndg3\_neg$ is a refractive index of glass of the negative lens, which is the second element from the object side in the third lens group, at the d-line, and
$vdg3\_neg$ is an Abbe number of the glass of the negative lens, which is the second element from the object side in the third lens group, at the d-line.

21. The imaging apparatus according to claim 19, wherein a prism block, which separates colors of the optical image, is disposed between the zoom lens and the imaging device.

* * * * *